US012675608B2

(12) United States Patent
Weston-Lewis et al.

(10) Patent No.: US 12,675,608 B2
(45) Date of Patent: Jul. 7, 2026

(54) METHOD AND SYSTEM FOR SANITIZATION OF SENSITIVE DATA

(71) Applicant: INFOSYS LIMITED, Bangalore (IN)

(72) Inventors: Sebastian Weston-Lewis, London (GB); Himanshu Gupta, Panchkula (IN)

(73) Assignee: Infosys Limited, Bangalore (IN)

( * ) Notice: Subject to any disclaimer, the term of this patent is extended or adjusted under 35 U.S.C. 154(b) by 278 days.

(21) Appl. No.: 18/525,433

(22) Filed: Nov. 30, 2023

(65) Prior Publication Data
US 2025/0103749 A1    Mar. 27, 2025

(30) Foreign Application Priority Data
Sep. 25, 2023    (IN) ............................. 202341064189

(51) Int. Cl.
*G06F 21/62*     (2013.01)
*G06F 21/60*     (2013.01)
*G06F 40/279*    (2020.01)

(52) U.S. Cl.
CPC ........ *G06F 21/6254* (2013.01); *G06F 21/602* (2013.01); *G06F 40/279* (2020.01)

(58) Field of Classification Search
CPC ... G06F 21/6254; G06F 40/279; G06F 21/602
See application file for complete search history.

(56) References Cited

U.S. PATENT DOCUMENTS

| | | | | |
|---|---|---|---|---|
| 11,308,236 | B2 * | 4/2022 | Childress | ................ G06F 21/84 |
| 12,443,575 | B1 * | 10/2025 | Baird | ...................... G06F 16/29 |
| 12,450,439 | B1 * | 10/2025 | Browder | ................ G16H 40/20 |
| 12,468,954 | B1 * | 11/2025 | M | ............................ G06N 3/08 |
| 2015/0356303 | A1 * | 12/2015 | Plastina | .............. G06F 21/6245 |
| | | | | 726/28 |
| 2018/0232528 | A1 * | 8/2018 | Williamson | ........ G06F 21/6245 |
| 2019/0370494 | A1 * | 12/2019 | Kurian | .................. G06F 40/295 |
| 2020/0311304 | A1 * | 10/2020 | Parthasarathy | ..... G06F 11/3006 |
| 2021/0409445 | A1 * | 12/2021 | Nambirajan | ........... G06N 20/00 |
| 2022/0277101 | A1 * | 9/2022 | Agarwal | .............. G06V 40/161 |
| 2023/0096474 | A1 * | 3/2023 | Krishnan | ............. G06N 3/0464 |
| | | | | 726/26 |
| 2024/0061952 | A1 * | 2/2024 | Kwok | .................. G06F 21/6245 |
| 2024/0330489 | A1 * | 10/2024 | Le Bouthillier | ...... G06F 21/604 |
| 2024/0428138 | A1 * | 12/2024 | Manikani | ............. G06N 3/0455 |
| 2025/0307459 | A1 * | 10/2025 | Natili | ...................... G06N 3/044 |
| 2025/0315449 | A1 * | 10/2025 | Aravamudan | .......... G06F 40/20 |

(Continued)

*Primary Examiner* — Stephen T Gundry
(74) *Attorney, Agent, or Firm* — Finnegan, Henderson, Farabow, Garrett & Dunner, LLP

(57) ABSTRACT

This disclosure relates to a method and system for sanitization of sensitive data. The method includes analyzing sensitive data present within a page of an application based on a deterministic algorithm. Further, the method includes classifying the sensitive data into a high risk sensitive data and a low risk sensitive data based on a ML classification algorithm. For the one or more sensitive data classified as the high risk sensitive data, the method further includes performing a destructive sanitization on each of the high risk sensitive data. For the one or more sensitive data classified as the high risk sensitive data, the method further includes performing a non-destructive sanitization on each of the high risk sensitive data.

20 Claims, 18 Drawing Sheets

(56) References Cited

U.S. PATENT DOCUMENTS

| | | | | |
|---|---|---|---|---|
| 2025/0322244 A1* | 10/2025 | Mysore | ............... | G06F 11/3684 |
| 2025/0322315 A1* | 10/2025 | Bhat | ................... | G06F 11/3684 |
| 2025/0323782 A1* | 10/2025 | Dods | ......................... | H04L 9/50 |
| 2025/0328506 A1* | 10/2025 | Stanley | .................... | G06N 5/01 |
| 2025/0328548 A1* | 10/2025 | Liu | ....................... | G06F 16/285 |
| 2025/0328560 A1* | 10/2025 | Madisetti | ............ | G06F 16/3329 |

* cited by examiner

—100

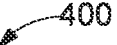

Destructive sanitization on each of the high risk sensitive data 303

Generate synthetic data corresponding to the high risk sensitive data 401

Replace the high risk sensitive data with the synthetic data 402

FIG. 4

Non-destructive sanitization on each of the high risk sensitive data 304

Encrypt the high risk sensitive data through an encryption key 501

Generate synthetic data corresponding to the high risk sensitive data 502

Replace the high risk sensitive data encrypted within the page with the synthetic data 503

Figures 7, 8:
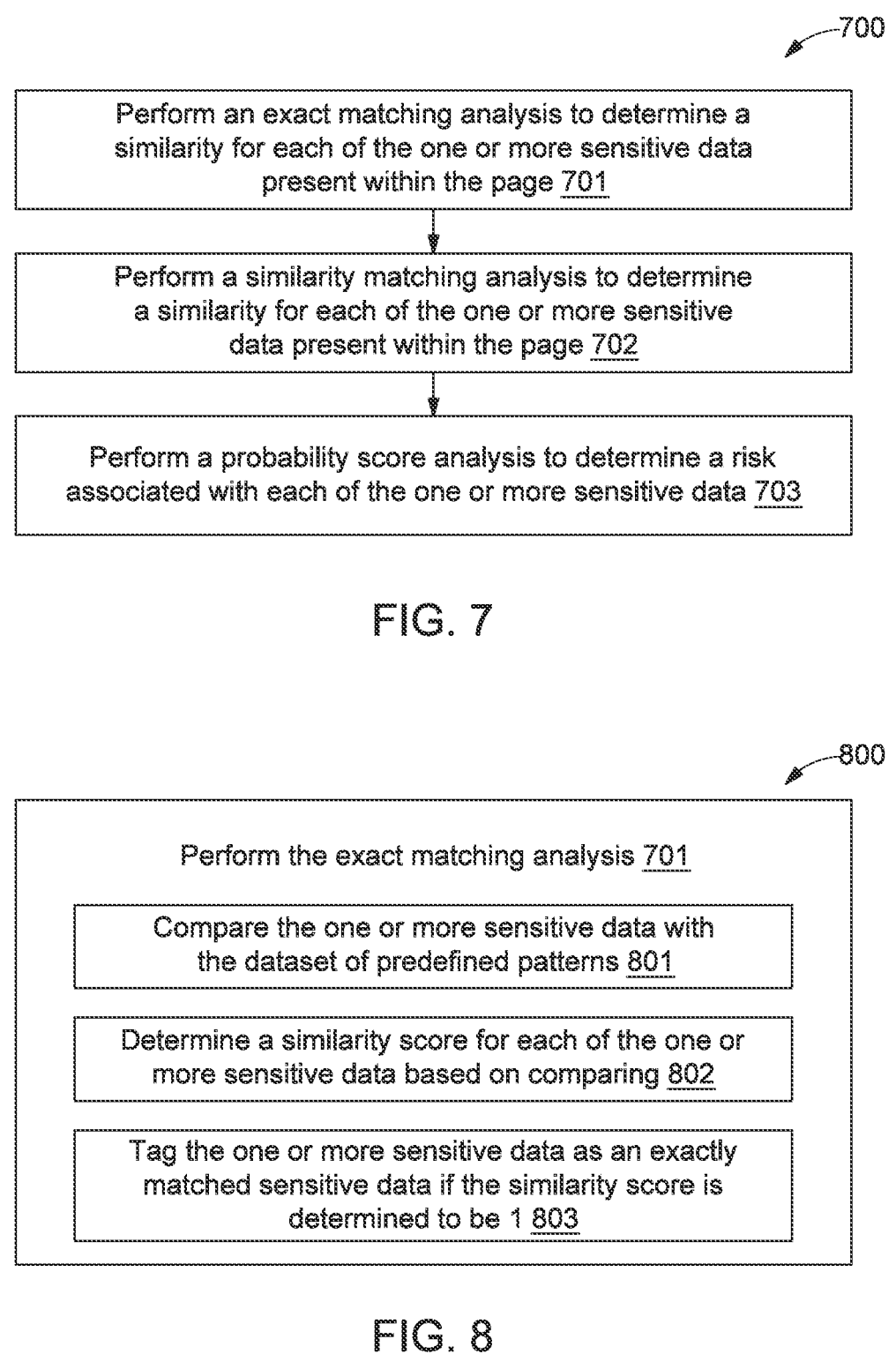

Perform an exact matching analysis to determine a similarity for each of the one or more sensitive data present within the page 701

Perform a similarity matching analysis to determine a similarity for each of the one or more sensitive data present within the page 702

Perform a probability score analysis to determine a risk associated with each of the one or more sensitive data 703

Perform the exact matching analysis 701

Compare the one or more sensitive data with the dataset of predefined patterns 801

Determine a similarity score for each of the one or more sensitive data based on comparing 802

Tag the one or more sensitive data as an exactly matched sensitive data if the similarity score is determined to be 1 803

Figures 9, 10:
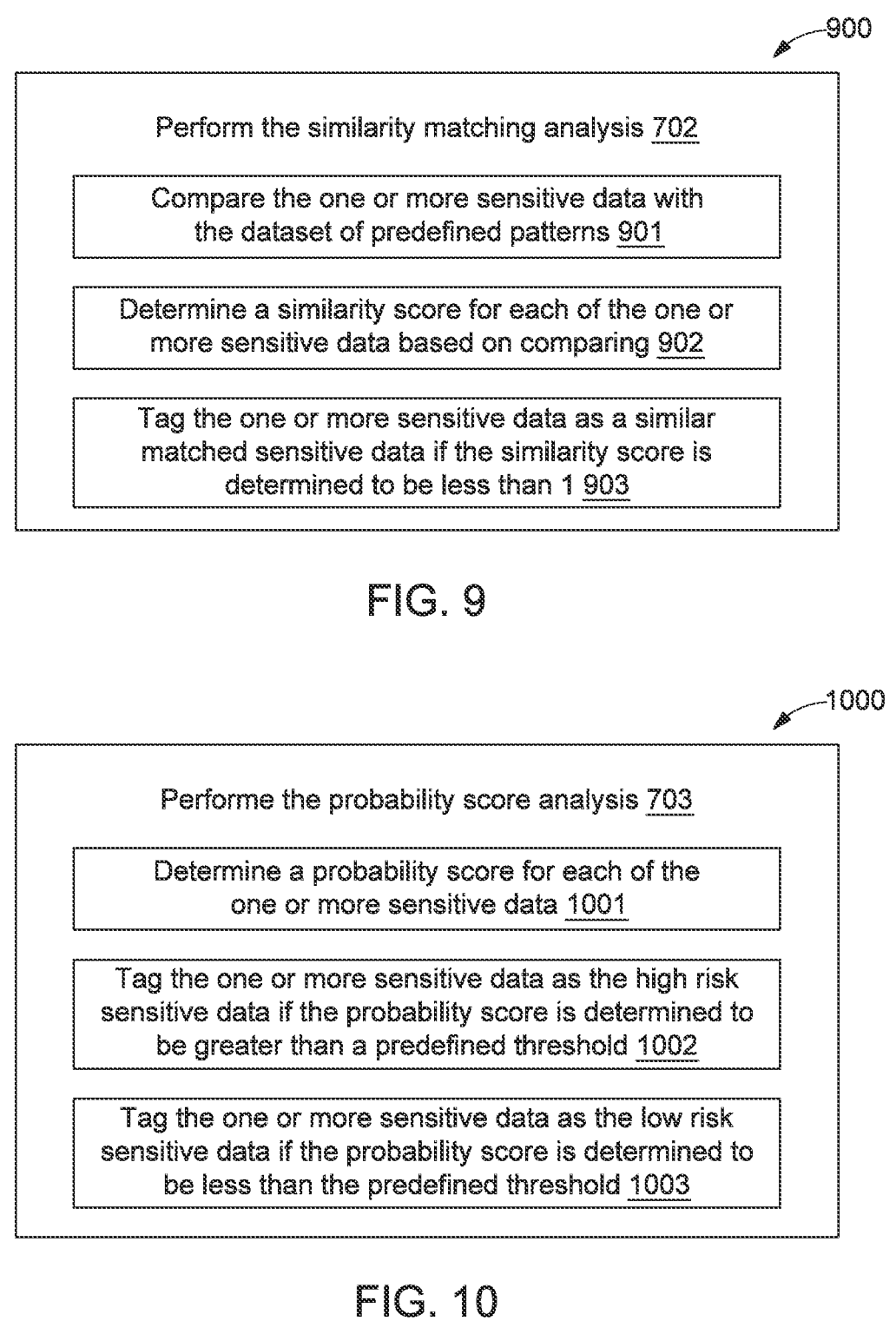

Perform the similarity matching analysis 702

Compare the one or more sensitive data with the dataset of predefined patterns 901

Determine a similarity score for each of the one or more sensitive data based on comparing 902

Tag the one or more sensitive data as a similar matched sensitive data if the similarity score is determined to be less than 1 903

Performe the probability score analysis 703

Determine a probability score for each of the one or more sensitive data 1001

Tag the one or more sensitive data as the high risk sensitive data if the probability score is determined to be greater than a predefined threshold 1002

Tag the one or more sensitive data as the low risk sensitive data if the probability score is determined to be less than the predefined threshold 1003

Figure 12B:
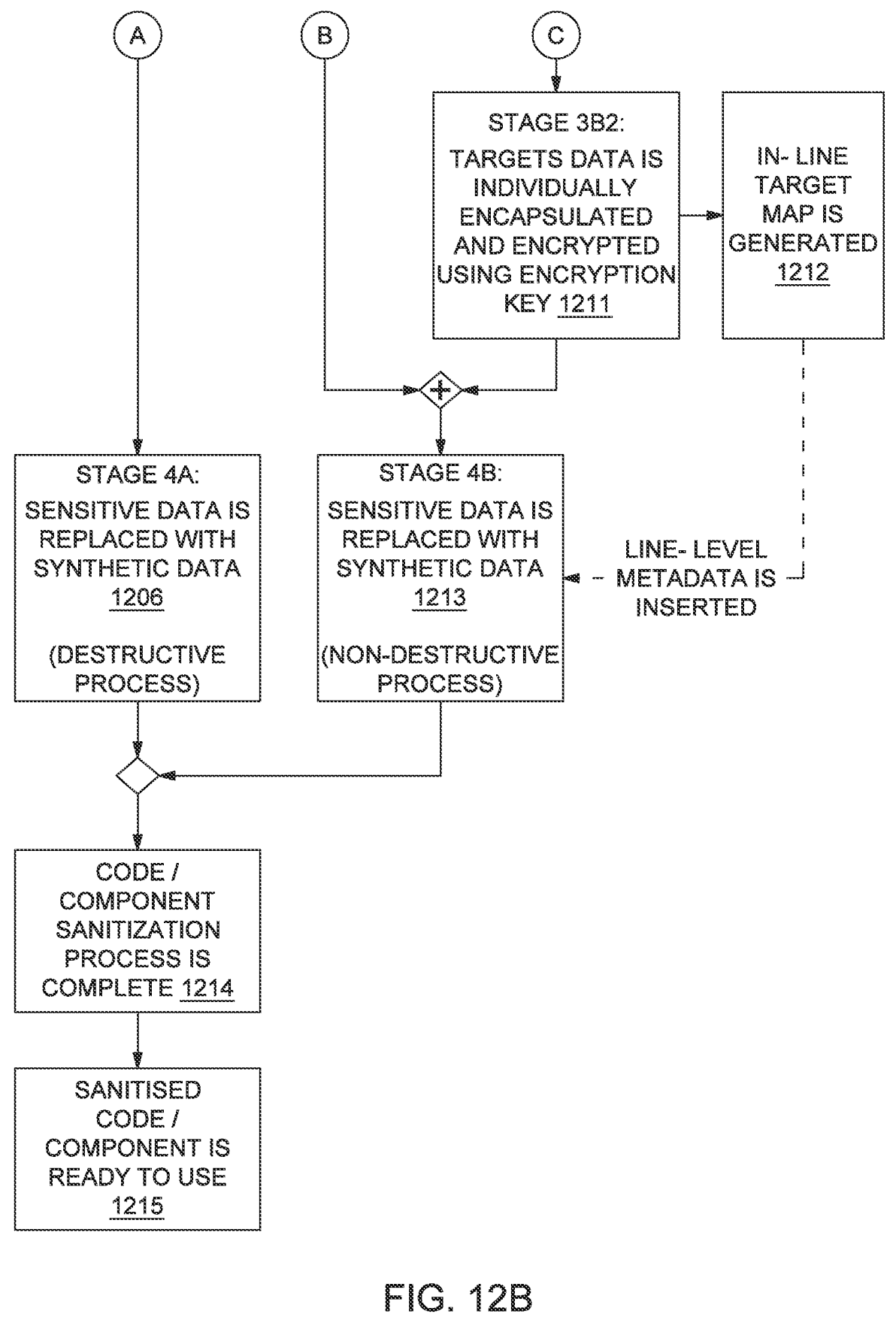

STAGE 3B2:

TARGETS DATA IS INDIVIDUALLY ENCAPSULATED AND ENCRYPTED USING ENCRYPTION KEY 1211

IN- LINE TARGET MAP IS GENERATED 1212

STAGE 4A:

SENSITIVE DATA IS REPLACED WITH SYNTHETIC DATA 1206

(DESTRUCTIVE PROCESS)

STAGE 4B:

SENSITIVE DATA IS REPLACED WITH SYNTHETIC DATA 1213

(NON-DESTRUCTIVE PROCESS)

LINE- LEVEL METADATA IS INSERTED

CODE / COMPONENT SANITIZATION PROCESS IS COMPLETE 1214

SANITISED CODE / COMPONENT IS READY TO USE 1215

ORDER CONFIRMATION
[LoyaltyProgramName] number # AB 84038764234
ORDER DATE : 29 JUNE 2023

COMPANY LOGO

Logout

Your details

Name

Seb

Surname

Weston- Lewis

Your address

1000 Collins Ave

2nd line

City / town / village

Miami Beach

Zip code

33139

State

FL - Florida

Country

United States of America

Contact details

Contact number

+1 ▽    7981634015

Email seb.weston- lewis@email.com

Shipping option
Express Shipping $9.99

Payment options

CARD LOGO    **  ** 9925

Subtotal

| | |
|---|---|
| Medicine1Name | $9.99 |
| Medicine2Name | $9.99 |
| PharmaProduct1_name | $9.99 |
| GenericProduct6_name | $9.99 |
| Total | $39.96 |

COMPANY LOGO

About us    Our PriceMatchExpressPromise    Vacancies    Help & Support

CompanyName  8763486735387    Company Address

ORDER CONFIRMATION

Logout

COMPANY LOGO

[LoyaltyProgramName] number # AB 84038764234

ORDER # 445566

ORDER DATE : 29 JUNE 2023

Your details

Name

Seb

Surname

Weston- Lewis

Subtotal

| | |
|---|---|
| Medicine1Name | $9.99 |
| Medicine2Name | $9.99 |
| PharmaProduct1_name | $9.99 |
| GenericProduct6_name | $9.99 |
| Total | $39.96 |

Your address

1000 Collins Ave

2nd line

City / town / village

Miami Beach

Zip code

33139

State

FL - Florida

Country

United States of America

Contact details

Contact number

+1 ▽   7981634015

Email seb.weston- lewis@email.com

Shipping option

Express Shipping $9.99

Payment options

CARD LOGO   **  ** 9925

COMPANY LOGO

About us    Our PriceMatchExpressPromise    Vacancies    Help & Support

CompanyName   8763486735387   Company Address

ORDER CONFIRMATION
COMPANY LOGO

LoyaltyProgram number # ABC 01188552100

Logout

ORDER # 8763298

ORDER DATE : 31 MARCH 2023

Your details

Name

Jon

Surname

Doe

Subtotal

| | |
|---|---|
| ProductName1 | $10.21 |
| ProductName2 | $16.66 |
| ProductName3 | $23.70 |
| ProductName4 | $29.99 |
| Total | $80.56 |

Your address

1234 Belmond Ave

2nd line

City / town / village

Belmond Beach

Zip code

31556

State

FL - Florida

Country

United States of America

Contact details

Contact number

+1 ▽    72654653426

Email jon.doe@ultramail.com

Shipping option

Express Shipping $9.99

Payment options

CARD LOGO    **  ** 1234

COMPANY LOGO

About us    Our PriceMatch    Vacancies    Help & Support

CompanyName    1234567890    Company Address

FIG. 14C

METHOD AND SYSTEM FOR SANITIZATION OF SENSITIVE DATA

CROSS-REFERENCE TO RELATED APPLICATION

This application claims priority to Indian Patent Application number 202341064189, filed on Sep. 25, 2023, which is hereby incorporated by reference in its entirety.

FIELD

This disclosure relates generally to data security and privacy, and more particularly to a method and a system for sanitization of sensitive data.

BACKGROUND

In today's digital era, the collection and processing of sensitive data within applications have become essential in various industries such as finance, healthcare, and e-commerce. Sensitive data, including personally identifiable information (PII), financial records, and confidential documents, needs to be protected from unauthorized access, data breaches, and privacy violations. With a rise of data protection regulations and increasing cybersecurity threats a need for data sanitization techniques has become even more important.

Traditional methods of data sanitization often involve manual identification and removal of sensitive information. However this process may be time consuming, prone to errors and lacks consistency. Additionally, due to the nature of applications and the abundance of data sources available today, manual methods alone are insufficient in addressing the complexities surrounding data privacy.

To address these challenges, there is a need for an automated and adaptive technique to sensitive data sanitization that may be capable of accurately identifying, categorizing, and replacing sensitive data with synthetically generated data within applications, while maintaining functionality and structure of the applications.

SUMMARY

In one embodiment, a method for sanitization of sensitive data is disclosed. In one example, the method may include analyzing one or more sensitive data present within a page of an application based on a deterministic algorithm. Further, the method may include classifying the one or more sensitive data into a high risk sensitive data and a low risk sensitive data based on a Machine Learning (ML) classification algorithm. For the one or more sensitive data classified as the high risk sensitive data, the method may further include performing a destructive sanitization on each of the high risk sensitive data. The destructive sanitization may include generating synthetic data corresponding to the high risk sensitive data and replacing the high risk sensitive data with the synthetic data. For the one or more sensitive data classified as the high risk sensitive data, the method may further include performing a non-destructive sanitization on each of the high risk sensitive data. The non-destructive sanitization may include encrypting the high risk sensitive data through an encryption key, generating synthetic data corresponding to the high risk sensitive data, and replacing the high risk sensitive data encrypted within the page with the synthetic data.

In one embodiment, a system for sanitization of sensitive data is disclosed. In one example, the system may include a processing circuitry and a memory communicatively coupled to the processing circuitry. The processing circuitry may store processor-executable instructions, which, on execution, may cause the processing circuitry to analyze one or more sensitive data present within a page of an application based on a deterministic algorithm. The processor-executable instructions, on execution, may further cause the processing circuitry to classify the one or more sensitive data into a high risk sensitive data and a low risk sensitive data based on a Machine Learning (ML) classification algorithm. For the one or more sensitive data classified as the high risk sensitive data, the processor-executable instructions, on execution, may further cause the processing circuitry to perform a destructive sanitization on each of the high risk sensitive data. The destructive sanitization may include generating synthetic data corresponding to the high risk sensitive data and replacing the high risk sensitive data with the synthetic data. For the one or more sensitive data classified as the high risk sensitive data, the processor-executable instructions, on execution, may further cause the processing circuitry to perform a non-destructive sanitization on each of the high risk sensitive data. The non-destructive sanitization may include encrypting the high risk sensitive data through an encryption key, generating synthetic data corresponding to the high risk sensitive data, and replacing the high risk sensitive data encrypted within the page with the synthetic data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 4 is a flow diagram of an exemplary process for performing destructive sanitization on sensitive data, in accordance with an exemplary embodiment of the present disclosure;

FIG. 5 is a flow diagram of an exemplary process for performing non-destructive sanitization on sensitive data, in accordance with an exemplary embodiment of the present disclosure;

FIG. 7 is a flow diagram of an exemplary process for determining risk profiles associated with one or more sensitive data, in accordance with an exemplary embodiment of the present disclosure;

FIG. 8 is a flow diagram of an exemplary process for performing an exact matching analysis, in accordance with an exemplary embodiment of the present disclosure;

FIG. 9 is a flow diagram of an exemplary process for performing a similarity matching analysis, in accordance with an exemplary embodiment of the present disclosure;

FIG. 10 is a flow diagram of an exemplary process for performing a probability score analysis, in accordance with an exemplary embodiment of the present disclosure;

FIGS. 12A-12B illustrate a block diagram of an exemplary process for sanitization of sensitive data without risk classification, in accordance with an exemplary embodiment of the present disclosure;

FIG. 14A illustrates an exemplary checkout page of an e-commerce application, in accordance with an exemplary embodiment of the present disclosure;

FIG. 14B illustrates an exemplary checkout page of an e-commerce application with classification of high risk data, in accordance with an exemplary embodiment of the present disclosure;

FIG. 14C is an exemplary checkout page of an e-commerce application with sanitized data, in accordance with an exemplary embodiment of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
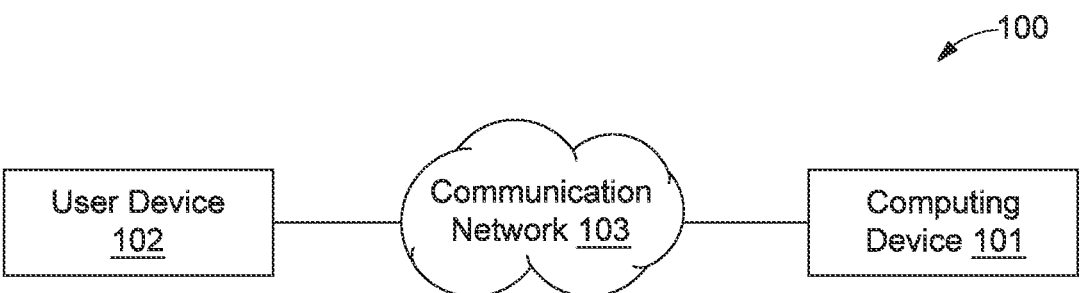
FIG. 1 is a block diagram of an environment for sanitization of sensitive data, in accordance with an exemplary embodiment of the present disclosure.

FIG. 1 is a diagram that illustrates an environment of a system 100 for sanitization of sensitive data, in accordance with an exemplary embodiment of the present disclosure. The environment 100 may include a computing device 101 and a user device 102. The computing device 101 and the user device 102 may be communicatively coupled with each other via a communication network 103. Examples of the communication network 104 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

The computing device 101 may be responsible for sanitization of sensitive data. In particular, the computing device 101 may be configured to perform one of a destructive sanitization or a non-destructive sanitization on the sensitive data (preferably on a high risk sensitive data). It is to be noted that the selection between the destructive sanitization and the non-destructive sanitization may be based on contextual factors, risk profiles, and data sensitivity evaluations.

In the destructive sanitization approach, synthetic data corresponding to the sensitive data may be generated. The generated synthetic data is carefully designed to mimic the original sensitive data's data type, format, and structure. Subsequently, the original sensitive data may be replaced with the synthetic data. This approach ensures that a functionality remains unharmed while protecting actual sensitive data from exposure.

Additionally, in the non-destructive sanitization approach, the sensitive data may be encrypted using a secure encryption key. Once encrypted, synthetic data may be generated to replace the encrypted sensitive data. Similar to the destructive approach, this technique maintains the structure and integrity while safeguarding the sensitive data through encryption.

To initiate the data sanitization process, the communication network 103 may facilitate the computing device 101 in accessing a specific page, which may be a web page, from an application residing in the user device 102. Examples of the user device 102 may include a smartphone, a tablet, a laptop, a desktop, a notebook, a mobile phone, an application server, or the like. The accessed page within the application may serve as a starting point for data sanitization operations.

The accessed page may take various forms, such as, but not limited to, a homepage, a product details page, a login page, or a checkout page of the application. The application may correspond to diverse domains including but not limited to, retail, e-commerce, online advertising, social media, telecommunications, insurance, automotive industry, financial services, travel, transportation, logistics, real estate, public and social sectors, sports, energy, mining, healthcare, education, or consumer packaged goods.

The computing device 101 may access the page of the application to analyze one or more sensitive data present within the page. The one or more sensitive data may include a variety of elements, such as, but not limited to, variable names, variable parameters, variable contents, file names, and text-based file present within the page. The analysis may be performed using a deterministic algorithm. The deterministic algorithm may include a predetermined set of rules and instructions designed to identify specific patterns and attributes within the data. In a more elaborative way, the deterministic algorithm plays essential role in identifying sensitive data elements within the page. It is responsible for recognizing patterns, variable names, parameters, and other text-based content that may indicate the presence of sensitive information. The output of the deterministic algorithm may serve as input for the subsequent classification step, where machine learning models take over to determine the risk profile.

By way of an example, if the accessed page is a product details page in an e-commerce application, the one or more sensitive data may include product names, customer names, transaction details, or other pieces of information that require protection. In this scenario, the deterministic algorithm may systematically scan and identify these sensitive data within the page, forming the basis for further sanitization actions. The sensitive data analysis carried out by the computing device 101 serves as the initial step in the data sanitization process.

Once the one or more sensitive data is analysed within the accessed page, the computing device 101 may further perform classification of the one or more sensitive data. The classification may be performed based on a Machine Learning (ML) classification algorithm that may segregate the one or more sensitive data into categories of a high risk and a low risk.

For the low risk sensitive data, no action may be taken. In the scenario where the one or more sensitive data is classified as high risk sensitive data, the sanitization process may proceed to the next stage. Here, the computing device 101 may offer two sanitization approaches: a destructive sanitization or a non-destructive sanitization. The choice between these two approaches may depend on several factors, including a nature of the sensitive data and a desired level of data protection.

For instances where the high risk sensitive data is selected for destructive sanitization, the computing device 101 may generate synthetic data. The synthetic data may replicate the characteristics of the original sensitive data. This synthetic data may be then seamlessly substituted in place of original high risk sensitive data within the page.

Alternatively, in scenarios involving non-destructive sanitization of the high risk sensitive data, the computing device 101 may employ encryption as a protecting measure. The high risk sensitive data may be encrypted using an encryption key, and synthetic data may be generated to match an encrypted format. Subsequently, the original high risk sensitive data is replaced with the encrypted synthetic data within the page. This approach maintains data confidentiality without altering the application's operational aspects.

The result of these sanitization actions may be the page that either include synthetic data or encrypted synthetic data, depending on the selected approach. This sanitized page may be then rendered to a user, thereby ensuring that the high risk sensitive data remains secure while delivering an optimal user experience.

For a sake of explanation, consider a scenario of an e-commerce application that handles customer orders. Within this application, there is a page that displays the order history of each customer. This order history may include sensitive information such as customer names, addresses, and order details. To ensure data privacy, the application may employ the sanitization process described earlier.

Suppose the deterministic algorithm identifies a piece of sensitive data on this page, which is a customer's full name: "John Smith". This sensitive data may be classified as high risk due to its potential impact if exposed. The computing device 102 needs to determine whether to perform destructive or non-destructive sanitization.

In this case, let's consider the non-destructive sanitization approach. The computing device 102 generates synthetic data that replicates the characteristics of the original sensitive data. In this context, the synthetic data may be a fabricated name like "Jane Doe". The synthetic data maintains the same data type (text), format (name), and structure (first name and last name) as the original sensitive data.

So, when the user accesses the sanitized page, instead of seeing the real customer name "John Smith", they may see the synthetic name "Jane Doe" in its place. This ensures that the user experience remains unaffected, as the application functions normally while safeguarding the actual sensitive data.

Figure 2:
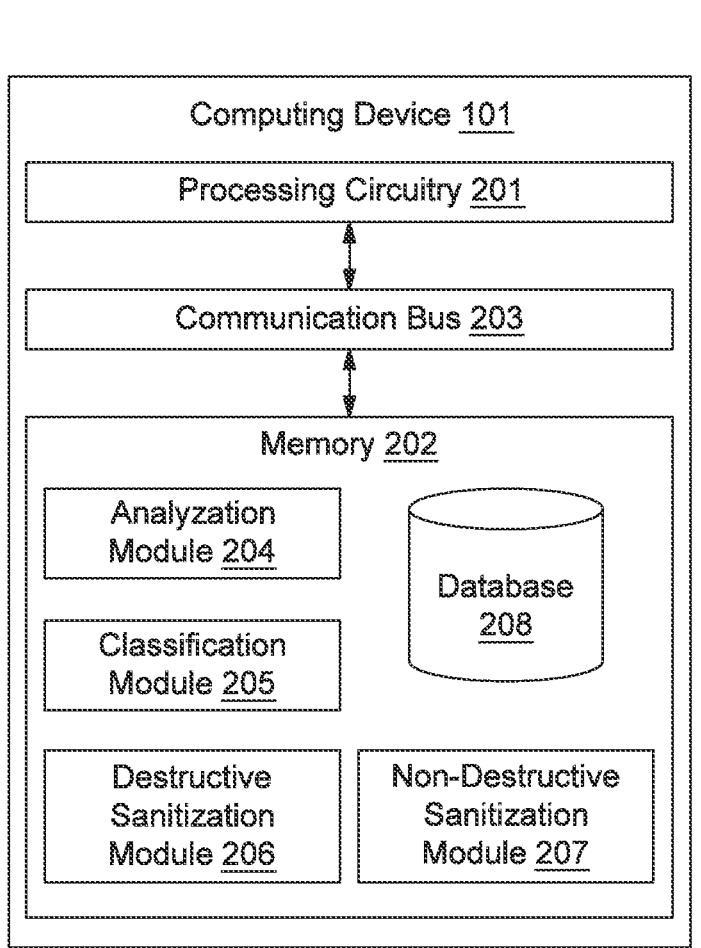
FIG. 2 is a block diagram of a computing device for sanitization of sensitive data, in accordance with an exemplary embodiment of the present disclosure.

FIG. 2 is a block diagram of a computing device 101 for sanitization of sensitive data, in accordance with an exemplary embodiment of the present disclosure. FIG. 2 is explained in conjunction with elements from FIG. 1. The computing device 101 may include a processing circuitry 201 and a memory 202 communicatively coupled to the processing circuitry 201 via a communication bus 203. The memory 202 may be a non-volatile memory or a volatile memory. Examples of non-volatile memory may include, but are not limited to, a flash memory, a Read Only Memory (ROM), a Programmable ROM (PROM), Erasable PROM (EPROM), and Electrically EPROM (EEPROM) memory. Examples of volatile memory may include, but are not limited to, Dynamic Random Access Memory (DRAM), and Static Random-Access Memory (SRAM).

The memory 202 may store processor instructions. The processor instructions, when executed by the processing circuitry 201, may cause the processing circuitry 201 to implement one or more embodiments of the present disclosure such as, but not limited to, analyze one or more sensitive data, classify the one or more sensitive data into a high risk sensitive data and a low risk sensitive data, and perform a destructive sanitization or a non-destructive sanitization on each of the high risk sensitive data. The memory 202 may also store various data (e.g., one or more sensitive data within the page, ML model parameters, sanitization data, synthetic data, data associated with predefined patterns, contextual information for ML models, etc.) that may be captured, processed, and/or required by the processing circuitry 201 of the computing device 101 to provide sanitization of the sensitive data. The memory 202 may include various modules i.e., an analyzation module 204, a classification module 205, a destructive sanitization module 206, a non-destructive sanitization module 207, and a database 208, that enables the computing device 101 to perform sanitization of the sensitive data.

In order to perform sanitization of the sensitive data, initially, the analyzation module 204 may analyze contents of a page within an application based on a deterministic algorithm. More specifically, by employing the deterministic algorithm, the analyzation module 204 may identify and extract one or more sensitive data, such as variable names, parameters, contents, file names, and text-based file content from the page that may indicate the presence of sensitive information.

The classification module 205 may be configured to classify a risk associated with each of the one or more sensitive data. The classification module 205 may employ a ML classification algorithm to determine risk profile of the one or more sensitive data. In particular, the ML classification algorithm may include a contextual-based ML model and a pattern matching ML model that may consider various factors, such as exact matching, similarity matching, and probability scores to categorize the one or more sensitive data into a low risk sensitive data and a high risk sensitive data.

To further elaborate, the contextual based ML model may be designed to be trained on a dataset of text-based predefined data that is directly associated with the sensitive data being analyzed. This dataset may include contextual information that may help the ML model to understand and recognize patterns within the sensitive data. By learning from this dataset, the contextual-based ML model gains the ability to identify and classify sensitive data based on its contextual usage and relevance.

Besides the contextual based ML model, the pattern matching ML model also plays an important role in the classification process. This model may be trained on a dataset of predefined patterns that are linked to the sensitive data. These predefined patterns may capture common structures, formats, or characteristics of sensitive data that the model may recognize. By learning from this dataset, the pattern matching ML model becomes capable to identify sensitive data through pattern recognition techniques.

Once the pattern matching ML model is trained, it may perform an exact matching analysis and a similarity matching analysis. These analyses are part of the classification process, where the ML models assess the similarity between the sensitive data and the predefined patterns.

In the exact matching analysis, the one or more sensitive data may be compared with the dataset of predefined patterns to determine a similarity score for each of the one or more sensitive data. The goal is to determine if there is an exact match between the one or more sensitive data and the predefined pattern. Upon comparison, if the similarity score is determined to be 1, it means that the sensitive data exactly matches a predefined pattern. Consequently, the one or more sensitive data may be tagged as "exactly matched sensitive data".

In similarity matching analysis, a comparison may be made between the one or more sensitive data and the dataset of predefined patterns to determine a similarity score for each of the one or more sensitive data. However, this time the focus is on assessing a degree of similarity. If the similarity score is less than 1, it indicates that there is some degree of similarity between the one or more sensitive data and a predefined pattern. As a result, the sensitive data may be tagged as "similar matched sensitive data".

After performing the exact matching analysis and the similarity matching analysis, a probability score analysis may be performed to determine a risk associated with each of the one or more sensitive data. In probability score analysis, a probability score may be determined of the one or more sensitive data. This probability score represents a likelihood of the sensitive data being high risk or low risk. If the probability score is determined to be greater than a predefined threshold, the one or more sensitive data is tagged as "high risk sensitive data". Conversely, if the probability score is determined to be less than the predefined threshold, the one or more sensitive data may be tagged as "low risk sensitive data".

The destructive sanitization module 206 comes into play when high risk sensitive data is identified. In the case of destructive sanitization, it generates synthetic data that replicates the characteristics of the original sensitive data. This synthetic data is then used to replace the original high risk sensitive data within the page.

Similar to the destructive sanitization module 206, the non-destructive sanitization module 207 may operate when high risk sensitive data is identified. However, instead of replacing the data, the non-destructive sanitization module 207 may first encrypt the high risk sensitive data using an encryption key and generate corresponding synthetic data. The encrypted sensitive data may be then replaced with the synthetic data within the page.

The database 208 may store a variety of data, including, but not limited to, sanitization data, predefined patterns, ML model parameters, contextual information for ML model, and other relevant information. This stored information may help the other modules in making informed decisions during the sanitization process.

It should be noted that all such aforementioned models 204-207 may be represented as a single engine or a combination of different engines. Further, as will be appreciated by those skilled in the art, each of the engines 204-207 may reside, in whole or in parts, on one device or multiple devices in communication with each other. In some embodiments, each of the engines 204-207 may be implemented as dedicated hardware circuit comprising custom application-specific integrated circuit (ASIC) or gate arrays, off-the-shelf semiconductors such as logic chips, transistors, or other discrete components. Each of the engines 204-207 may also be implemented in a programmable hardware device such as a field programmable gate array (FPGA), programmable array logic, programmable logic device, and so forth. Alternatively, each of the engines 204-207 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for sanitization of sensitive data. For example, the exemplary computing device 101 may provide for sanitization of the sensitive data by the processes discussed herein. In particular, as will be appreciated by those of ordinary skill in the art, control logic and/or automated routines for performing the techniques and steps described herein may be implemented by the computing server 101 either by hardware, software, or combinations of hardware and software. For example, suitable code may be accessed and executed by the one or more processors on the computing device 101 to perform some or all of the techniques described herein. Similarly, application specific integrated circuits (ASICs) configured to perform some, or all of the processes described herein may be included in the one or more processors on the computing device 101.

Figure 3:
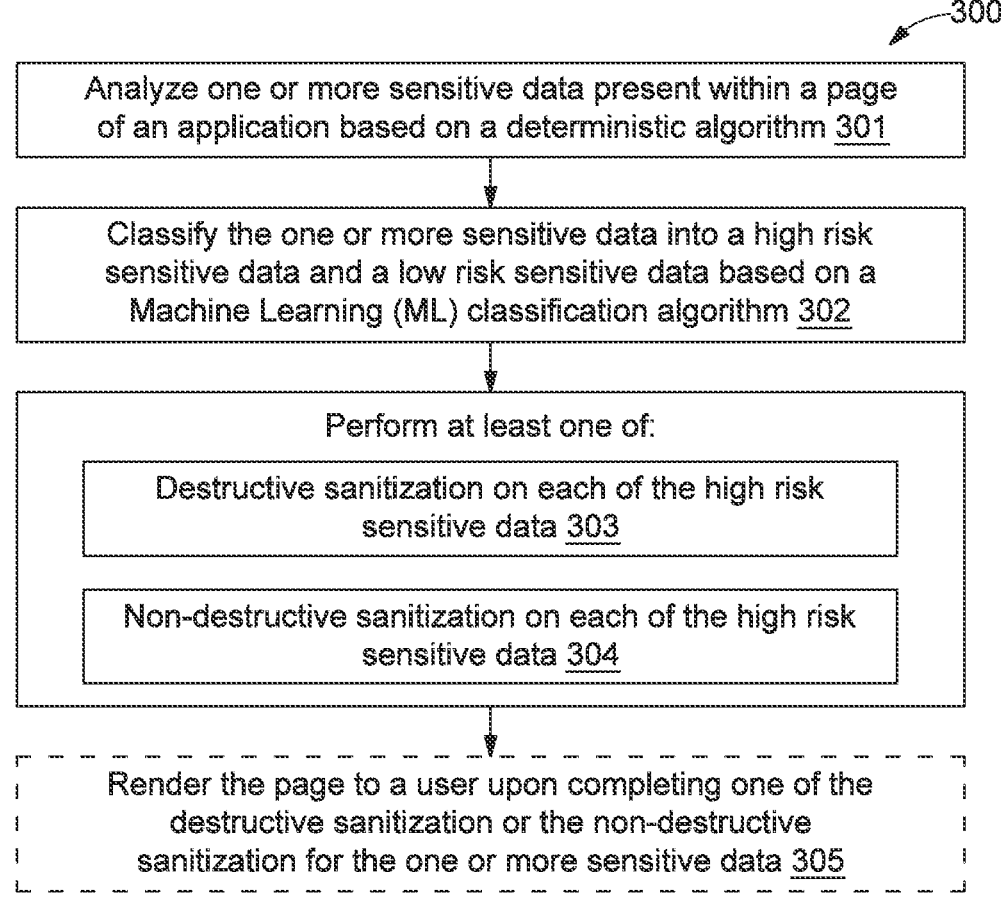
FIG. 3 is a flow diagram of an exemplary process for sanitization of sensitive data, in accordance with an exemplary embodiment of the present disclosure.

FIG. 3 is a flow diagram of an exemplary process 300 for sanitization of sensitive data depicted via a flowchart, in accordance with an exemplary embodiment of the present disclosure. FIG. 3 is explained in conjunction with elements from FIGS. 1 and 2. In an embodiment, the process 300 may be implemented by the computing device 101.

The process 300 may include analyzing one or more sensitive data present within a page of an application based on a deterministic algorithm, at step 301. The sensitive data may include various types of information such as variable names, variable parameters, variable contents, file names, and text-based file content present on the page. The primary purpose of this analysis is to identify sensitive data that requires protection.

After the initial analysis, the process 300 may further include classifying the one or more sensitive data into a high risk sensitive data and a low risk sensitive data based on a Machine Learning (ML) classification algorithm, at step 302.

In an embodiment, the ML classification algorithm may utilize a contextual based ML model and a pattern matching ML model for classifying the one or more sensitive data. The contextual based ML model may be trained on a dataset of text-based predefined data associated with the one or more sensitive data. It may use the contextual information to make classification decisions.

Additionally, the pattern matching ML model may be trained on a dataset of predefined patterns linked to the sensitive data. It may focus on identifying specific patterns in the data.

For the one or more sensitive data classified as the high risk sensitive data, the process 300 may further include performing a destructive sanitization on each of the high risk sensitive data, at step 303. In this step, synthetic data that replicates the characteristics of the original sensitive data may be generated. This ensures that the high risk sensitive data is eliminated from the page while maintaining its structure and format. A method of performing destructive sanitization is further explained in conjunction with FIG. 4.

For the one or more sensitive data classified as the high risk sensitive data, the process 300 may further include performing a non-destructive sanitization on each of the high risk sensitive data, at step 304. In this case, the high risk sensitive data is encrypted using an encryption key. This method allows for data protection without altering the original format. A method of performing non-destructive sanitization is further explained in conjunction with FIG. 5.

FIG. 4 is a flow diagram of an exemplary process 400 for performing destructive sanitization on sensitive data depicted via a flowchart, in accordance with an exemplary embodiment of the present disclosure. FIG. 4 is explained in conjunction with elements from FIGS. 1, 2, and 3. In an embodiment, the process 400 may be implemented by the computing device 101.

As explained earlier with reference to FIG. 3, for the one or more sensitive data classified as the high risk sensitive data, a destructive sanitization may be performed on each of the high risk sensitive data, at step 303.

Therefore, to perform destructive sanitization, the process 400 may include generating synthetic data corresponding to the high risk sensitive data, at step 401. The synthetic data is artificially created data that replicates the characteristics, format, and structure of the original sensitive data. This synthetic data is designed to closely resemble the high risk sensitive data it is replacing.

Further, the process 400 may include replacing the high risk sensitive data with the synthetic data, at step 402. This replacement may occur within the context where the high risk sensitive data was initially found. The purpose of this step is to ensure that the sensitive data is effectively removed or masked, thereby reducing the risk associated with its exposure.

FIG. 5 is a flow diagram of an exemplary process 500 for performing non-destructive sanitization on sensitive data depicted via a flowchart, in accordance with an exemplary embodiment of the present disclosure. FIG. 5 is explained in conjunction with elements from FIGS. 1, 2, 3, and 4. In an embodiment, the process 500 may be implemented by the computing device 101.

As explained earlier with reference to FIG. 3, for the one or more sensitive data classified as the high risk sensitive data, a non-destructive sanitization may be performed on each of the high risk sensitive data, at step 304. Therefore, to perform non-destructive sanitization, the process 500 may include encrypting the high risk sensitive data through an encryption key, at step 501. This encryption is a protective measure to ensure that the data remains confidential even during the sanitization process. It includes encoding the high risk sensitive data in a way that may only be decrypted by someone with the appropriate encryption key.

Further, the process 500 may include generating synthetic data corresponding to the high risk sensitive data, at step 502. This synthetic data may be designed to closely mimic the original sensitive data in terms of data type, format, and structure. It may be created to serve as a substitute for the high risk sensitive data.

Further, the process 500 may include replacing the high risk sensitive data encrypted within the page with the synthetic data, at step 503. Importantly, this replacement occurs within the page where the original sensitive data is located. This ensures that the high risk sensitive data is effectively concealed, and the user interacts with synthetic data rather than the original sensitive data or content.

Figure 6A:
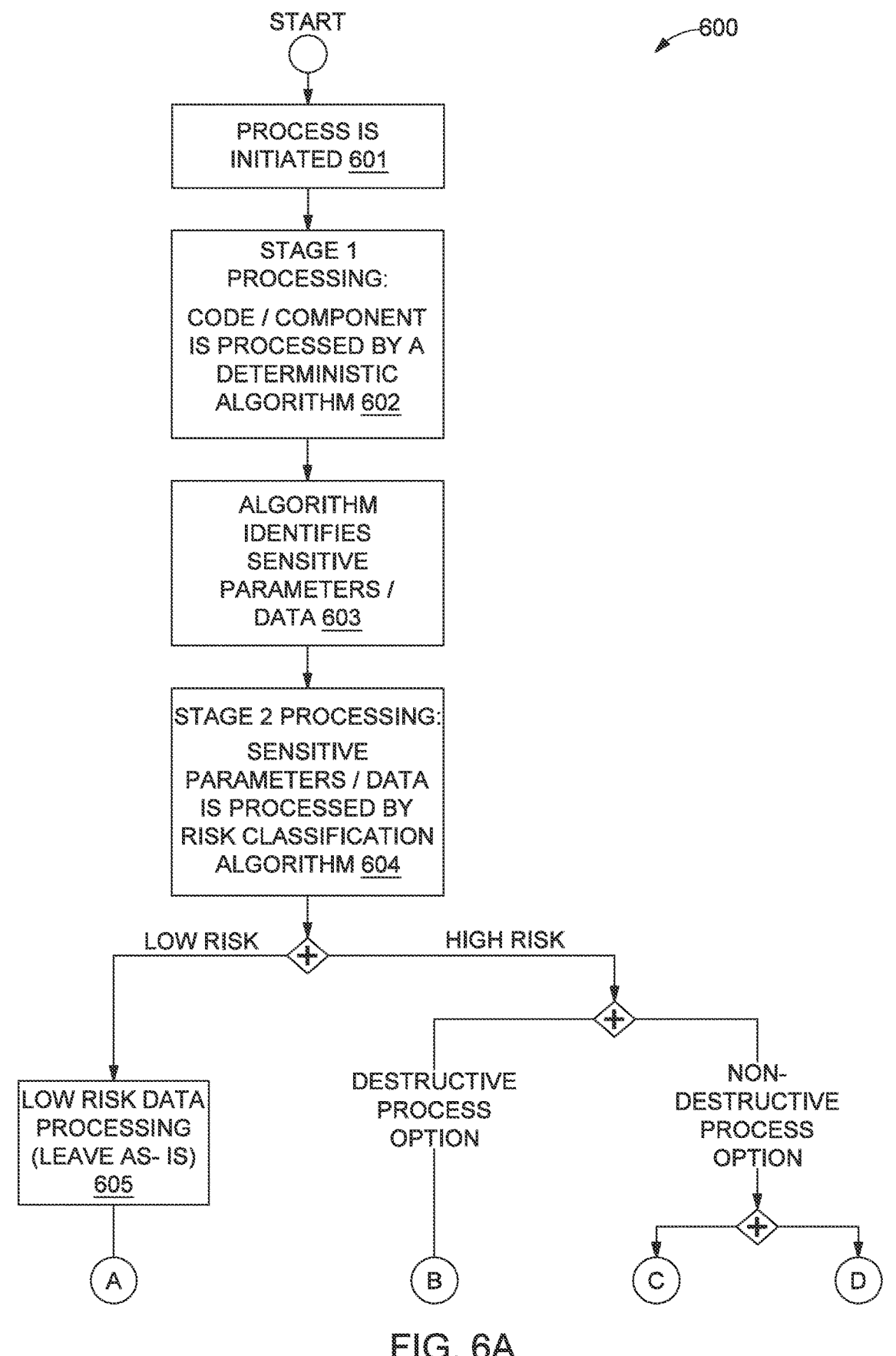
FIGS. 6A-6B illustrate a functional block diagram of an exemplary process for sanitization of sensitive data, in accordance with an exemplary embodiment of the present disclosure.
Figure 6B:
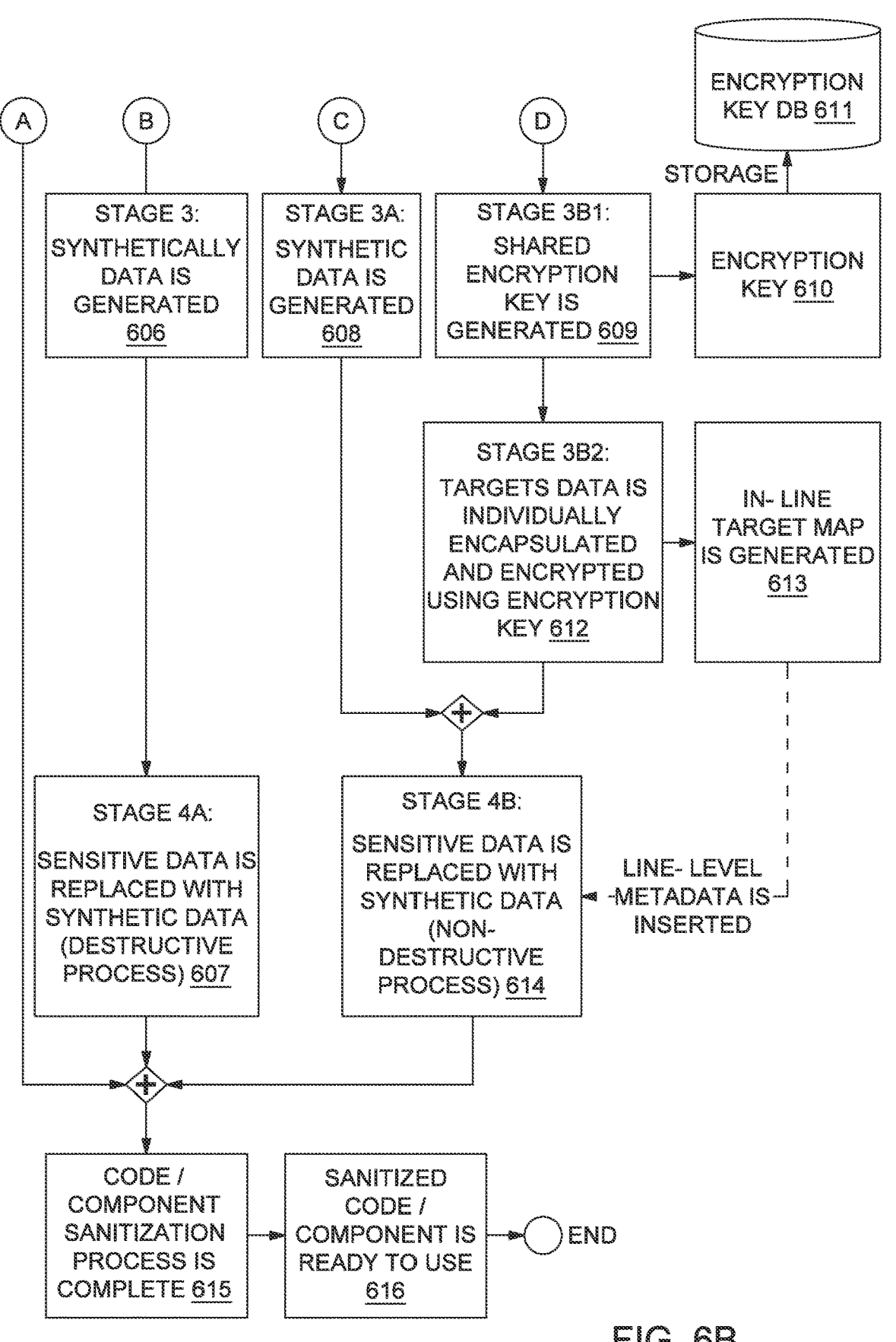

FIGS. 6A-6B illustrate a functional block diagram of an exemplary process 600 for sanitization of sensitive data, in accordance with an exemplary embodiment of the present disclosure. FIGS. 6A-6B is explained in conjunction with elements from FIGS. 1, 2, 3, 4, and 5. The process begins with an initialization step at block 601. This is the starting point where the sanitization process is initiated.

Next, at block 602, the code or component undergoes processing through a deterministic algorithm. At block 603, the deterministic algorithm identify sensitive parameters or data within the code or component, which may include various elements like variable names, variable parameters, variable contents, file names, and text-based file content. These elements may represent the information that needs to be evaluated for risk.

Once the sensitive parameters or data have been identified, they are subjected to a risk classification algorithm at block 604. The risk classification algorithm is responsible for categorizing the identified sensitive parameters or data into different risk levels. Specifically, it classifies them as high risk, low risk, or as unidentified data. The high risk sensitive parameters or data may follow specific patterns, such as "Infosys.com", "Infosys_hero_image", etc. While the low-risk sensitive parameters or data may have patterns like "var17_a1", etc.

For data classified as low risk, no further action is taken in block 605. This indicates that low risk data is left untouched and retained in its original form. For the unidentified data, human intervention may be required for the classification. This is explained in greater detail in conjunction with FIGS. 11A-11B.

When high-risk sensitive parameters or data are identified, the process presents two options: destructive sanitization and non-destructive sanitization. In the destructive sanitization process, synthetic data is initially generated to replicate the characteristics of original high risk sensitive data, at block 606. Subsequently, this synthetic data is used to replace the original high risk sensitive data within the code or component, at block 607.

In the non-destructive sanitization process, several steps are involved. Initially, synthetic data is generated, at block 608, and an encryption key is created, at block 609. The encryption key 610 may be stored in an encryption key database 611 for later references.

Further, each high risk sensitive data, for example, target data is individually encapsulated and encrypted using the encryption key, at block 612. Simultaneously, an in-line target map is generated, at block 613. This map is a record or reference that keeps track of the high risk sensitive data that has been encrypted and replaced with synthetic data within the code or component.

In particular, the target map is a sort of roadmap or guide that notes which portions of the code or component have undergone encryption and substitution. It may help to maintain a clear link between the original high risk sensitive data and the corresponding synthetic data. This map may be created to ensure that, at a later stage, the system may efficiently and accurately reverse the process if necessary or maintain a record of the changes made.

At block 614, the encrypted data is replaced with the synthetic data, while line-level metadata obtained from block 613 is inserted. Line-level metadata can include additional information or markers associated with specific lines or sections of the code or component. The metadata may serve various purposes, such as providing context or additional details about the encrypted and replaced data. It may help in tracking and understanding what changes were made to the code or component during the sanitization process.

Particularly, the insertion of line-level metadata may ensure that the changes made to the code or component are well documented and that there is a clear reference to the original data that are replaced. This documentation is valuable for both reviewing purposes and for maintaining transparency in the code sanitization process.

Finally, the block 615 signifies the completion of the code or component sanitization process. At this stage, the code or component has undergone the necessary sanitization measures, and it is now ready for use, and the process stops at block 616.

FIG. 7 is a flow diagram of an exemplary process 700 for determining risk profiles associated with one or more sensitive data depicted via a flowchart, in accordance with an exemplary embodiment of the present disclosure. FIG. 7 is explained in conjunction with elements from FIGS. 1, 2, 3, 4, 5, and 6A-6B. In an embodiment, the process 700 may be implemented by the computing device 101. In order to determine risk profiles associated with the one or more sensitive data, the process 700 may perform exact matching, similarity matching and probability matching analyses.

At step 701, the process 700 may include performing an exact matching analysis to determine a similarity for each of the one or more sensitive data present within the page. In a more elaborative way, the exact matching analysis may be used to precisely identify sensitive data that matches predefined patterns or criteria. When data matches these patterns exactly, it is considered as high risk because it's a direct match to known sensitive information.

For instance, if a variable name exactly matches a pattern associated with social security numbers (e.g., "SSN_123456789"), it is crucial to identify it as a high risk sensitive data immediately.

At step 702, the process 700 may further include performing a similarity matching analysis to determine a similarity for each of the one or more sensitive data present within the page. The sensitive data may not always match predefined patterns exactly. There may be slight variations, or deviations from the expected format. Therefore, to detect such variations, the similarity matching analysis may be used.

By way of an example, consider a variable that include a social security number, but is labeled as "SocSecNum" instead of "SSN." The similarity matching may detect this as a high risk data because it closely resembles the expected format.

At step 703, the process 700 may further include performing a probability score analysis to determine a risk associated with each of the one or more sensitive data. The probability score analysis plays an important role in classifying the one or more sensitive data into a high risk or low risk. This is further explained in conjunction with FIG. 10.

FIG. 8 is a flow diagram of an exemplary process 800 for performing an exact matching analysis depicted via a flowchart, in accordance with an exemplary embodiment of the present disclosure. FIG. 8 is explained in conjunction with elements from FIGS. 1, 2, 3, 4, 5, 6A-6B, and 7. In an embodiment, the process 800 may be implemented by the computing device 101.

In order to perform exact matching analysis, initially, at step 801, the process 800 may include comparing the one or more sensitive data with the dataset of predefined patterns. This dataset, also known as the "pattern repository," may act as a reference including specific patterns or templates against which the sensitive data is compared. This initial comparison may serve as the foundation for further analysis.

At step 802, the process 800 may further include determining a similarity score for each of the one or more sensitive data based on comparing. This similarity score may be determined based on the extent of resemblance between the sensitive data and the predefined patterns in the dataset. It may quantify how closely the sensitive data aligns with these patterns.

Finally, at step 803, the process 800 may evaluate the similarity score determined in the previous step. If the similarity score is determined to be exactly 1, it may signify that the sensitive data is an exact match with one of the predefined patterns in the dataset. In this case, the process 800 may tag the one or more sensitive data points as "exactly matched sensitive data".

FIG. 9 is a flow diagram of an exemplary process 900 for performing a similarity matching analysis depicted via a flowchart, in accordance with an exemplary embodiment of the present disclosure. FIG. 9 is explained in conjunction with elements from FIGS. 1, 2, 3, 4, 5, 6A-6B, 7, and 8. In an embodiment, the process 900 may be implemented by the computing device 101.

In order to perform similarity matching analysis, initially, at step 901, the process 900 may include comparing the one or more sensitive data with the dataset of predefined patterns. At step 902, the process 900 may further include determining a similarity score for each of the one or more sensitive data based on comparing. This similarity score may quantify how closely the sensitive data aligns with the predefined patterns stored in the dataset.

Finally, at step 903, the process 900 may evaluate the determined similarity score. In particular, if the similarity score falls below the value of 1 (indicating that the sensitive data has some degree of similarity with the predefined patterns), the process 900 may proceed to tag the one or more sensitive data as "similar matched sensitive data".

FIG. 10 is a flow diagram of an exemplary process 1000 for performing a probability score analysis depicted via a flowchart, in accordance with an exemplary embodiment of the present disclosure. FIG. 10 is explained in conjunction with elements from FIGS. 1, 2, 3, 4, 5, 6A-6B, 7, 8, and 9. In an embodiment, the process 1000 may be implemented by the computing device 101.

In order to perform probability score analysis, initially, at step 1001, the process 1000 may include determining a probability score for each of the one or more sensitive data. The probability score may be determined by a ML model. The ML model may be trained on a dataset of known sensitive data and its corresponding risk levels. The ML model learns to associate certain features of the sensitive data with its risk level.

When a new piece of data is encountered, the ML model may analyze its features and determines a probability score for that data. The probability score is a measure of how likely the data is to be sensitive.

The probability score may serve as an essential basis for subsequent decision-making steps in the sanitization process. Specifically, it determines whether a particular data point may be categorized as high risk or low risk, which in turn informs the sanitization approach to be applied to that data.

At step 1002, the process 1000 may further include tagging the one or more sensitive data as the high risk sensitive data if the probability score is determined to be greater than a predefined threshold. This means the process 1000 has determined that this data is likely to be sensitive and may be treated with caution.

At step 1003, the process 1000 may further include tagging the one or more sensitive data as the low risk sensitive data if the probability score is determined to be less than the predefined threshold. This indicates that the data is less likely to be sensitive or poses a lower risk to security or privacy.

Figure 11A:
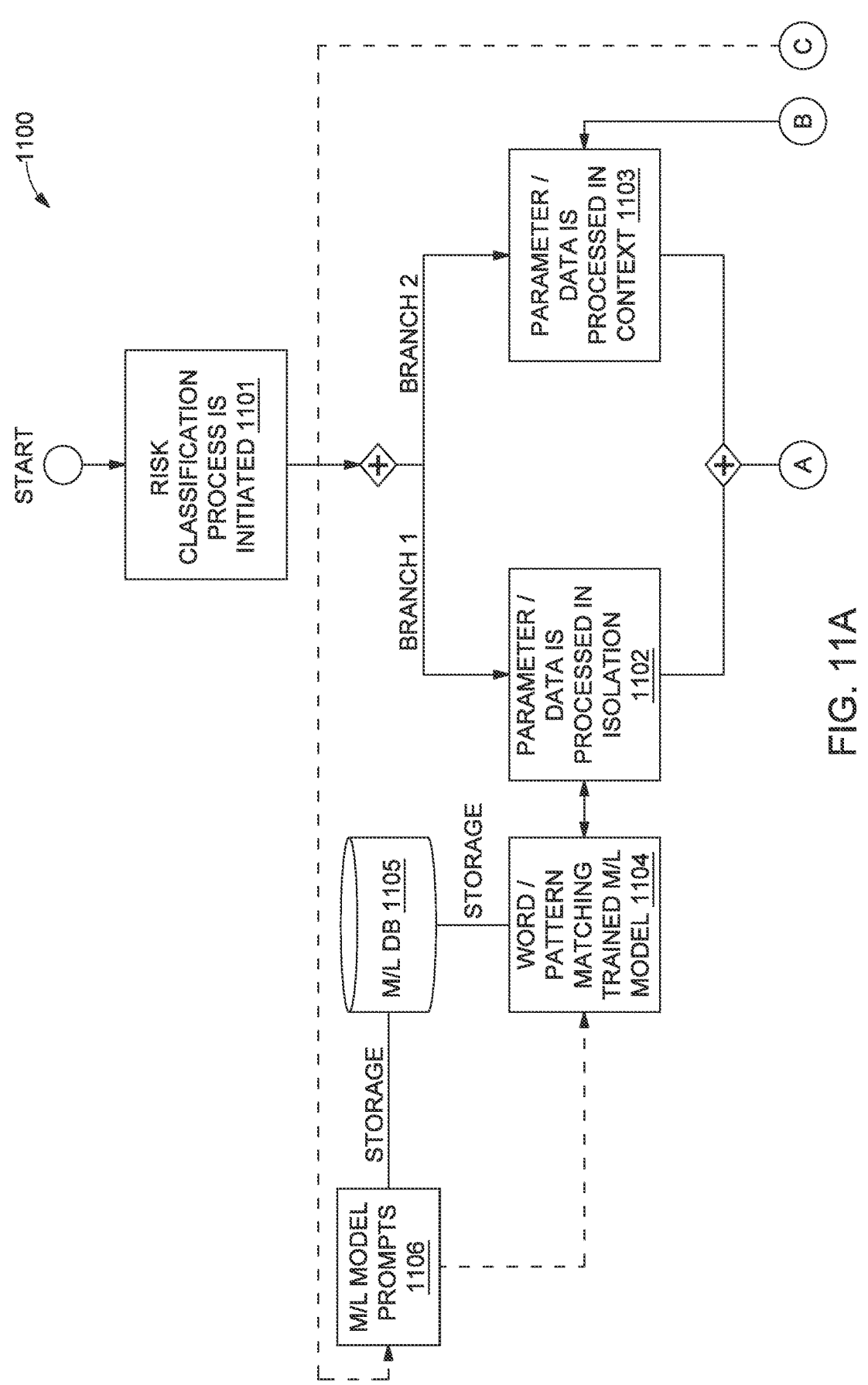
FIGS. 11A-11B illustrate a functional block diagram of an exemplary process for risk classification, in accordance with an exemplary embodiment of the present disclosure.
Figure 11B:
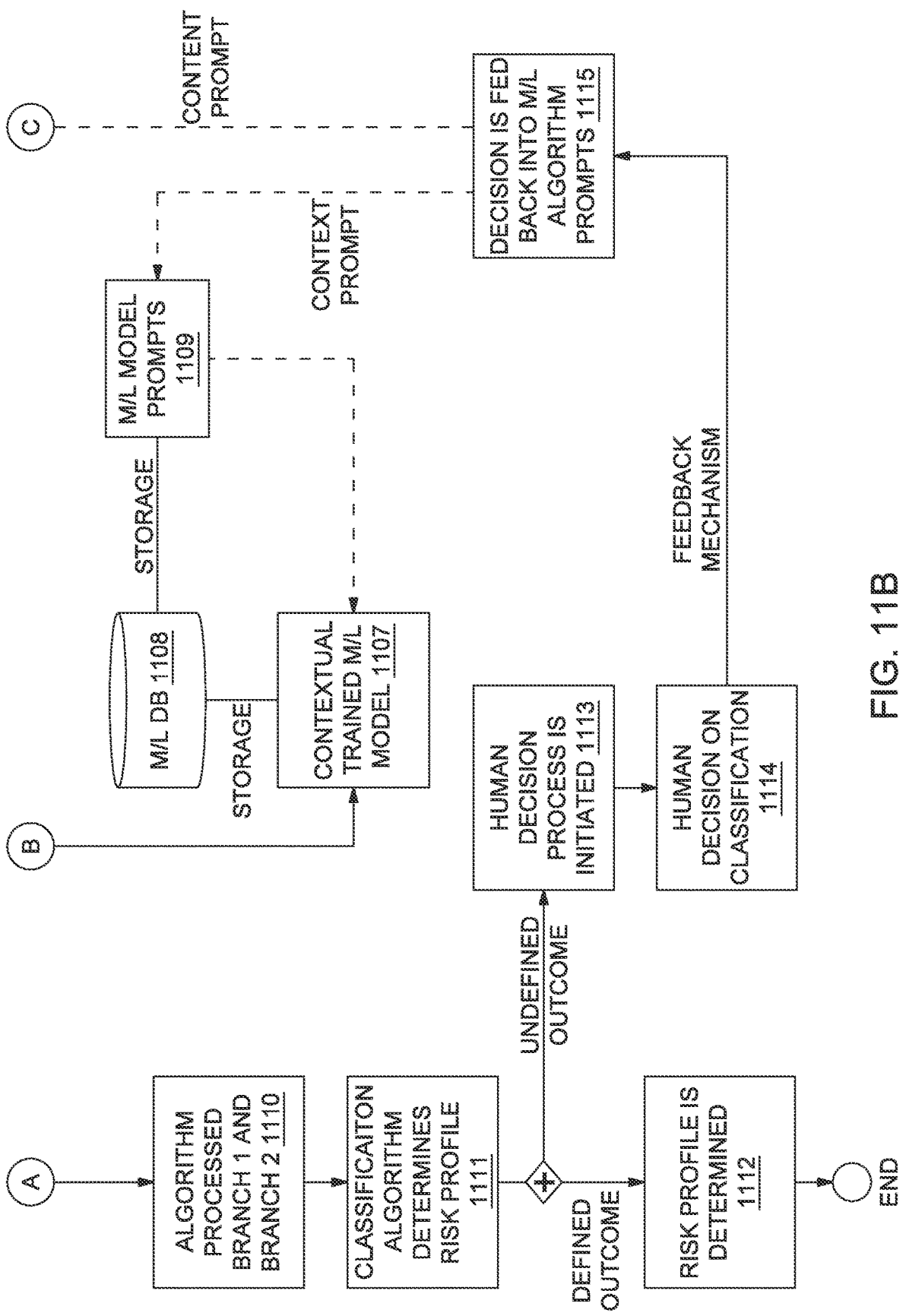

FIGS. 11A-11B illustrate a functional block diagram of an exemplary process 1100 for risk classification, in accordance with an exemplary embodiment of the present disclosure. FIG. 11 (11A-11B) is explained in conjunction with elements from FIGS. 1, 2, 3, 4, 5, 6A-6B, 7, 8, 9, and 10. The risk classification process is initiated at block 1101.

The process 1100 of risk classification may be divided into two branches: branch 1 and branch 2. When the process 1100 follow branch 1, the sensitive parameters or data may be processed in isolation, at step 1102. This means that the sensitive data is processed independently without considering the context in which it appears.

For the sensitive parameters or data to be processed in isolation, a trained ML model (such as, a pattern matching ML model) performs a word or pattern matching analysis, at step 1104. The ML model has learned patterns from a dataset of predefined patterns stored in an ML database (ML DB 1105) that are associated with the one or more sensitive data. The pattern matching analysis may be include exact matching analysis and similarity matching analysis. ML model prompts of block 1106 may be used to activate the trained ML model for performing the pattern matching analysis. These prompts are designed to instruct the ML model on what kind of analysis to conduct on the sensitive data. In addition to the pattern matching, a probability score analysis is performed as explained earlier. It assigns a probability score to each of the one or more sensitive data to determine risk profile. The process of performing the exact matching analysis, similarity matching analysis, and the probability analysis is already explained in conjunction with FIGS. 8, 9, and 10.

When the process 1100 follow branch 2, the sensitive parameters or data may be processed with consideration of its context, at step 1103. For the sensitive parameters or data to be processed in context, a contextual analysis may be performed through a contextual based trained ML model, at block 1107. In the contextual analysis, the contextual-based ML model classifies the one or more sensitive data according to its contextual significance. This classification helps in determining the risk profile of the sensitive data. For instance, if the sensitive data is contextually linked to a critical function within the application, it may be classified as high risk.

To train the contextual-based ML model, a dataset of text-based predefined data stored in the ML database (ML DB 1108) is used. This dataset may include information related to the context in which sensitive data appears. To initiate the contextual analysis, ML model prompts (as mentioned in block 1106) are used. These prompts provide instructions to the contextual-based ML model to consider the context in which sensitive data is found within the application.

The results from both branch 1 and branch 2 are combined and processed by the ML classification algorithm, at block 1110. The classification algorithm may determine the risk profile associated with each of the one or more sensitive data, at block 1111. The risk profile may be categorized as high risk, low risk, or undefined risk based on the analysis performed. For sensitive data with a clear risk profile (such as high risk or low risk), the process 1100 ends at block 1112.

When the risk is undefined, indicating uncertainty, the process initiates a human decision step, at block 1113. In this case, human intervention is needed to classify the one or more sensitive data, at block 1114. A human decision is made to determine whether the data is high risk, low risk, or something else. The decision made by humans is fed back into the ML prompts of block 1106 and block 1109 using a content prompt. This feedback helps improve the ML models for future analyses.

Figure 12A:
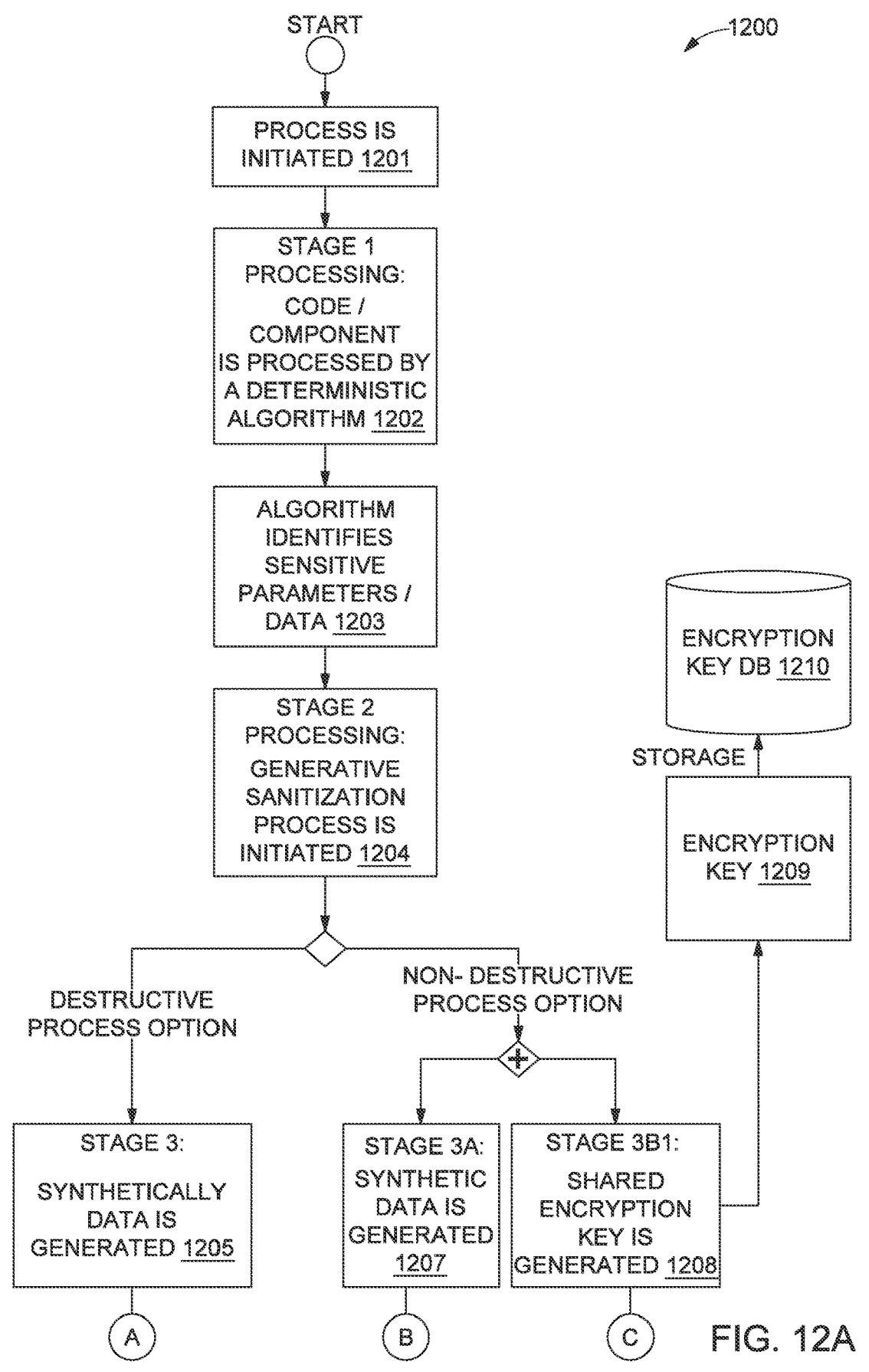

FIGS. 12A-12B illustrate a block diagram of an exemplary process 1200 for sanitization of sensitive data without risk classification, in accordance with an exemplary embodiment of the present disclosure. FIG. 12 (12A-12B) is explained in conjunction with elements from FIGS. 1, 2, 3, 4, 5, 6A-6B, 7, 8, 9, 10, and 11A-11B. The process begins with an initialization step at block 1201. This is the starting point where the sanitization process is initiated.

Further, at block 1202, the code or component undergoes processing through a deterministic algorithm. At block 1203, the deterministic algorithm identify sensitive parameters or data within the code or component, which may include various elements like variable names, variable parameters, variable contents, file names, and text-based file content. These elements may represent the information that needs to be evaluated for possible risk.

Once the sensitive parameters or data have been identified, a generative sanitization process may be initiated, at block 1204. The sanitization process may present two options: a destructive sanitization and a non-destructive sanitization. It should be noted that irrespective of the process 600 of FIGS. 6A-6B, the present process 1200 may not consider the risk profile before performing sanitization process. In particular, the destructive sanitization and the non-destructive sanitization may be performed without classifying the sensitive data into a high risk or low risk.

In some situations, the process may not involve classifying sensitive data into high risk or low risk categories before applying sanitization. Instead, it may directly proceed with either destructive or non-destructive sanitization without a prior risk assessment. This means that the data is sanitized without first determining whether it is high risk or low risk sensitive data.

In the destructive sanitization option, synthetic data is initially generated to replicate the characteristics of original sensitive data, at block 1205. Subsequently, this synthetic data is used to replace the original sensitive data within the code or component, at block 1206.

In the non-destructive sanitization option, initially, synthetic data is generated, at block 1207, and an encryption key is created, at block 1208. The encryption key (at block 1209) may be stored in an encryption key database (at block 1210) for further references.

Further, each of the sensitive data, for example, target data is individually encapsulated and encrypted using the encryption key, at block 1211. Simultaneously, an in-line target map is generated, at block 1212. This map is a record or reference that keeps track of the sensitive data that has been encrypted and replaced with synthetic data within the code or component.

In particular, the target map is a sort of roadmap or guide that notes which portions of the code or component have undergone encryption and substitution. It may help to maintain a clear link between the original sensitive data and the corresponding synthetic data. This map may be created to ensure that, at a later stage, the system may efficiently and accurately reverse the process if necessary or maintain a record of the changes made.

At block 1213, the encrypted data is replaced with the synthetic data, while line-level metadata obtained from block 1212 is inserted. Line-level metadata may include additional information or markers associated with specific lines or sections of the code or component. The metadata may serve various purposes, such as providing context or additional details about the encrypted and replaced data. It may help in tracking and understanding what changes were made to the code or component during the sanitization process.

Particularly, the insertion of line-level metadata may ensure that the changes made to the code or component are well documented and that there is a clear reference to the original sensitive data that are replaced. This documentation is valuable for both reviewing purposes and for maintaining transparency in the code sanitization process.

Finally, the block 1214 signifies the completion of the code or component sanitization process. At this stage, the code or component has undergone the necessary sanitization measures, and it is now ready for use, and the process stops at block 1215.

Figure 13A:
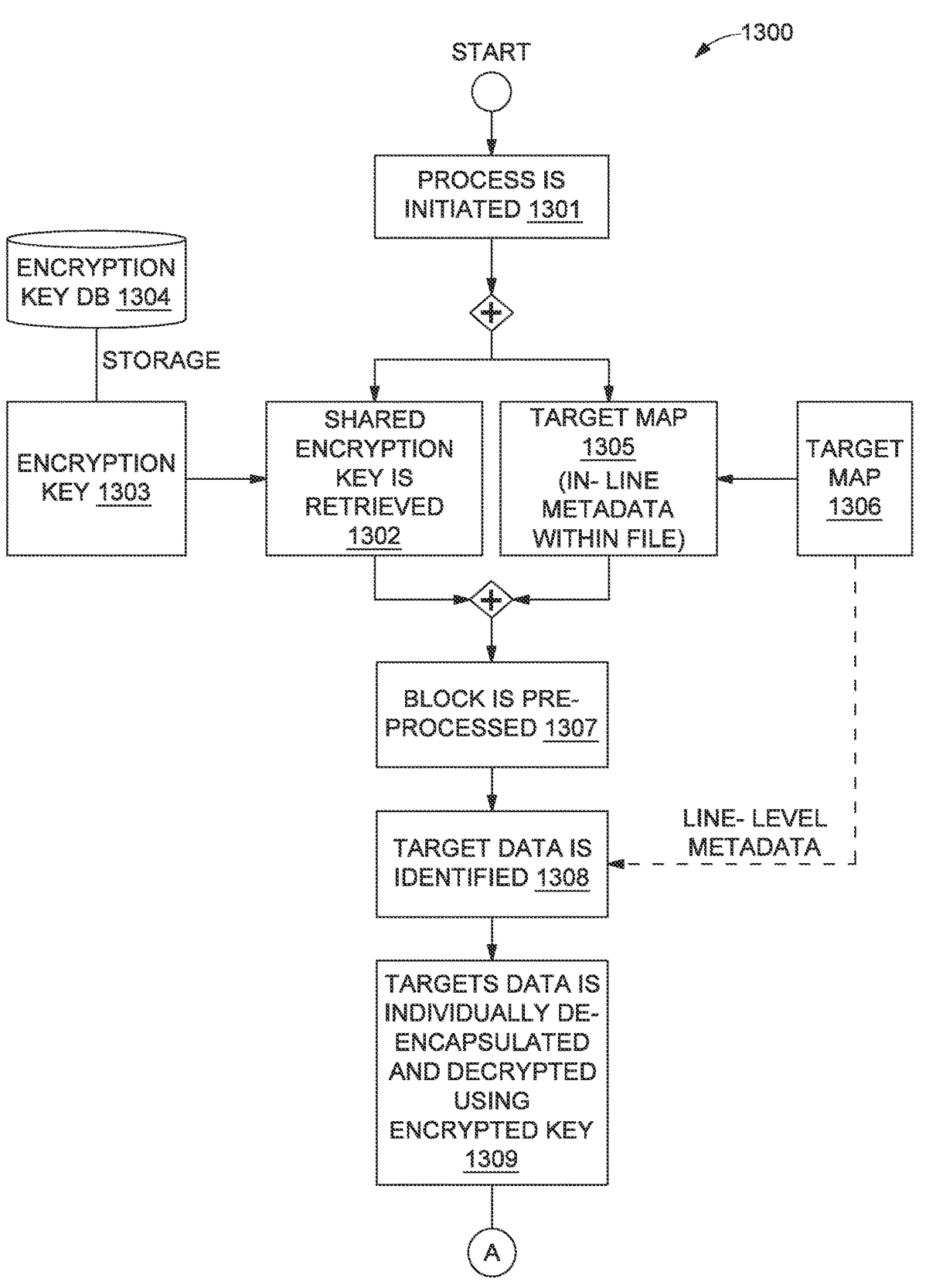
FIGS. 13A-13B illustrate a block diagram of an exemplary process for de-sanitization of non-destructive sensitive data, in accordance with an exemplary embodiment of the present disclosure.
Figure 13B:
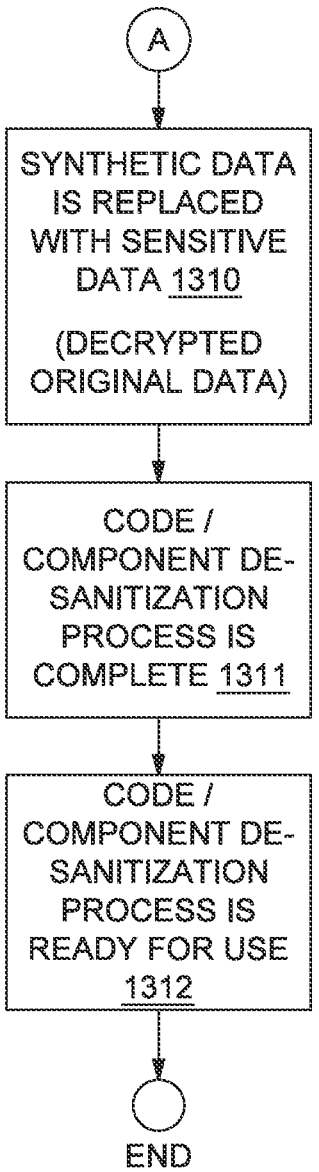

FIGS. 13A-13B illustrate a block diagram of an exemplary process 1300 for de-sanitization of non-destructive sensitive data, in accordance with an exemplary embodiment of the present disclosure. FIG. 13 (13A-13B) is explained in conjunction with elements from FIGS. 1, 2, 3, 4, 5, 6A-6B, 7, 8, 9, 10, 11A-11B, and 12A-12B. The de-sanitization process is initiated at block 1301. The de-sanitization process begins at this point, where the process 1300 is ready to reverse the non-destructive sanitization that was previously applied to sensitive data.

To start the de-sanitization of non-destructive sensitive data, the process 1300 retrieves the encrypted key, at block 1302. This key is essential for decrypting the sensitive data that was previously secured. The encrypted key 1303 is obtained from an encryption key database (encryption key DB 1304). Simultaneously, the process 1300 combines the retrieved encrypted key of block 1302 with a target map of block 1305. The target map essentially contains in-line metadata associated with the sensitive data to be de-sanitized. This combination is an essential step for correctly de-sanitizing the data.

At block 1307, the combined data is then pre-processed at this stage. The pre-processing may include preparing the data for the de-sanitization process. Further, the process 1300 identify target data by injecting the line-level metadata retrieved from the target map of block 130. This metadata may help to determine which part of the data were originally sensitive and needed to be restored.

Once the target data is identified, it is individually de-encapsulated and decrypted using the encrypted key, at block 1308. This step essentially reverses the encryption applied during non-destructive sanitization, returning the data to its original form.

After de-encapsulation and decryption, the synthetic data that was temporarily in place is now replaced with the sensitive data in its original, decrypted format, at block

1310. With the sensitive data successfully restored, the de-sanitization process is considered complete, at block 1311.

Finally, the de-sanitized code or component is now ready for use, at block 1312. It has been effectively restored to its original state and may be utilized in the application or any other system.

FIG. 14A is an exemplary checkout page 1400A of an e-commerce application, in accordance with an exemplary embodiment of the present disclosure. FIG. 14A is explained in conjunction with elements from FIGS. 1, 2, 3, 4, 5, 6A-6B, 7, 8, 9, 10, 11A-11B, 12A-12B, and 13A-13B. The checkout page 1400A is where the user enters their payment information and shipping information to complete their purchase. The page 1400A may include the elements, for example, but not limited to, customer name, customer address, order details, payment information, shipping information, and subtotal cost of the items being purchased.

The data sanitization process may identify the sensitive data elements in the checkout page 1400A, such as a credit card number and expiration date, and then take steps to protect those elements. The specific steps that are taken may depend on a type of sensitive data and a risk level of the data.

For example, if the sensitive data is the credit card number, the data sanitization process may encrypt the credit card number or replace it with a synthetic number. If the sensitive data is a password, then the data sanitization process may hash the password or replace it with a random string of characters.

The data sanitization process may be applied to all of the elements as shown in the checkout page 1400A. This may ensure that all of the sensitive data in the checkout web page 1400A is protected. This is further explained in conjunction with FIG. 14B.

FIG. 14B is an exemplary checkout page 1400B of an e-commerce application with classification of high risk data, in accordance with an exemplary embodiment of the present disclosure. FIG. 14B is explained in conjunction with elements from FIGS. 1, 2, 3, 4, 5, 6A-6B, 7, 8, 9, 10, 11A-11B, 12A-12B, 13A-13B, and 14A. In this scenario of checkout page 1400B, the classification algorithm is actively applied to identify high-risk sensitive data elements within the page 1400B.

For example, the classification algorithm may tag certain elements within the page 1400B as high-risk sensitive data. As illustrated in present FIG. 14B, the order date "29 Jun. 2023", and the customer's name "Seb Weston-Lewis" are tagged as the high risk sensitive data. Similarly, other elements like the address of the customer "1000 Collins Ave", contact number "7981634015" credit card number "**  ** 9925", and the like are also tagged as the high risk sensitive data.

Therefore, the sanitization process may be employed on these high risk sensitive data where these high risk sensitive data is replaced by synthetic data. This ensures that the most sensitive information on the checkout page is thoroughly protected and secure.

FIG. 14C is an exemplary checkout page 1400C of an e-commerce application with sanitized data, in accordance with an exemplary embodiment of the present disclosure. FIG. 14C is explained in conjunction with elements from FIGS. 1, 2, 3, 4, 5, 6A-6B, 7, 8, 9, 10, 11A-11B, 12A-12B, 13A-13B, 14A, and 14B. At this stage, the data sanitization process is complete, and the rendered checkout page 1400C is now presented to the user. In this final stage, the original data within the page has been replaced with corresponding synthetized data. The generated synthetic data resembles to the one or more sensitive data of the page in terms of data type, format, and structure.

For example, as illustrated in present FIG. 14C, the original order date "29 Jun. 2023", is replaced with synthetically generated date "31 Mar. 2023" and the original customer's name "Seb Weston-Lewis" is replaced with synthetically generated customer name "Jon Doe". Similarly, other elements like the original address of the customer "1000 Collins Ave" is replaced with synthetically generated address "1234 Belmond Ave", original contact number "7981634015" is replaced with synthetically generated contact number "72654653426", original credit card number "**   9925", is replaced with synthetically generated credit card number "   1234" and so on. For a clear illustration, consider this example: In FIG. 14C, the original order date "29 Jun. 2023" has been securely substituted with synthetically generated data, now showing "31 Mar. 2023". Similarly, the original customer's name, "Seb Weston-Lewis", has been replaced with synthetically generated data, now displaying "Jon Doe". This process is consistent across various elements on the page. The original customer address "1000 Collins Ave" is now synthetically generated as "1234 Belmond Ave", and the original contact number "7981634015" has been replaced with synthetically generated "72654653426". Even the original credit card number "   9925" is now represented as "  ** 1234".

In essence, this final checkout page, 1400C, demonstrates the successful application of the data sanitization process. Sensitive information has been effectively protected by replacing it with synthetic data, ensuring that the user may interact with the application securely while safeguarding their confidential information.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 15:
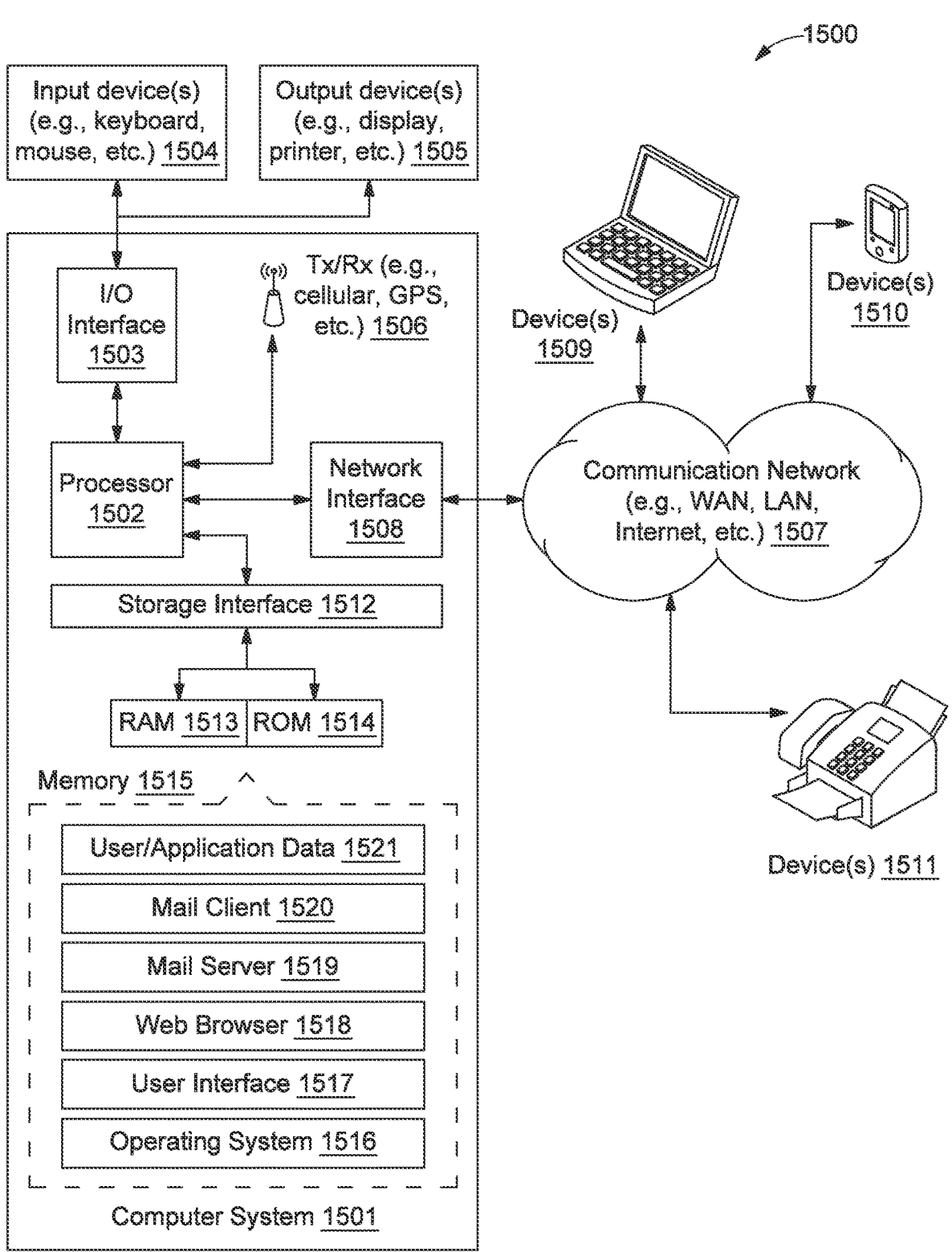
FIG. 15 is a block diagram that illustrates a system architecture of a computer system for sanitization of sensitive data, in accordance with an exemplary embodiment of the present disclosure.

The disclosed methods and systems may be implemented on a conventional or a general-purpose computer system, such as a personal computer (PC) or server computer. FIG. 15 is a block diagram that illustrates a system architecture 1500 of a computer system 1501 for sanitization of sensitive data, in accordance with an exemplary embodiment of the present disclosure. Variations of computer system 1501 may be used for implementing computing device 101 for sanitization of sensitive data. Computer system 1501 may include a central processing unit ("CPU" or "processor") 1502. Processor 1502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1502 may be disposed in communication with one or more input/output (I/O) devices via I/O interface 1503. The I/O interface 1503 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1503, the computer system 1501 may communicate with one or more I/O devices. For example, the input device 1504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1505 may be a printer, fax machine, video display (e.g., cathode ray tube (CRT), liquid crystal display (LCD), light-emitting diode (LED), plasma, or the like), audio speaker, etc. In some embodiments, a transceiver 1506 may be disposed in connection with the processor 1502. The transceiver 1506 may facilitate several types of wireless transmission or reception. For example, the transceiver 1506 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1502 may be disposed in communication with a communication network 1507 via a network interface 1508. The network interface 1508 may communicate with the communication network 1507. The network interface 1508 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1507 may include, without limitation, a direct interconnection, local area network (LAN), wide area network (WAN), wireless network (e.g., using Wireless Application Protocol), the Internet, etc. Using the network interface 1508 and the communication network 1507, the computer system 1501 may communicate with devices 1505, 1509, 1510, and 1511. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLER, NOOK® etc.), laptop computers, notebooks, gaming consoles (MICROSOFT® XBOX®, NINTENDO® DS®, SONY® PLAYSTATION®, etc.), or the like. In some embodiments, the computer system 1501 may itself embody one or more of these devices.

In some embodiments, the processor 1502 may be disposed in communication with one or more memory devices 1515 (e.g., RAM 1513, ROM 1514, etc.) via a storage interface 1512. The storage interface 1512 may connect to memory devices 1515 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1515 may store a collection of program or database components, including, without limitation, an operating system 1516, user interface 1517, web browser 1518, mail server 1519, mail client 1520, user/application data 1521 (e.g., any data variables or data records discussed in this disclosure), etc. The operating system 1516 may facilitate resource management and operation of the computer system 1501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 1517 may facilitate display, execution, interaction, manipulation, or operation of program components through textual or graphical facilities. For example, user interfaces may provide computer interaction interface elements on a display system operatively connected to the computer system 1501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1501 may implement a web browser 1518 stored program component. The web browser 1518 may be a hypertext viewing application, such as MICROSOFT® INTERNET EXPLORER®, GOOGLE® CHROME® MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVAR, application programming interfaces (APIs), etc. In some embodiments, the computer system 1501 may implement a mail server 1519 stored program component. The mail server 1519 may be an Internet mail server such as MICROSOFT® EXCHANGE®, or the like. The mail server 1519 may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server 1519 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1501 may implement a mail client 1520 stored program component. The mail client 1520 may be a mail viewing application, such as APPLE MAIL®, MICROSOFT ENTOURAGE®, MICROSOFT OUTLOOK®, MOZILLA THUNDERBIRD®, etc.

In some embodiments, computer system 1501 may store user/application data 1521, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of sanitization of sensitive data by first analyzing one or more sensitive data present within a page of an application based on a deterministic algorithm. Further, the method and system further classify the one or more sensitive data into a high risk sensitive data and a low risk sensitive data based on a ML classification algorithm. For the one or more sensitive data classified as the high risk sensitive data, the method and system may perform a destructive sanitization on each of the high risk sensitive data. The destructive sanitization may include generating synthetic data corresponding to the high risk sensitive data and replacing the high risk sensitive data with the synthetic data. For the one or more sensitive data classified as the high risk sensitive data, the method and system may further perform a non-destructive sanitization on each of the high risk sensitive data. The non-destructive sanitization may include encrypting the high risk sensitive data through an encryption key, generating synthetic data corresponding to the high risk sensitive data, and replacing the high risk sensitive data encrypted within the page with the synthetic data.

As will be appreciated by those skilled in the art, the techniques described in the various embodiments discussed above are not routine, or conventional, or well understood in the art. The techniques discussed above provide various advantages that significantly enhance data security and privacy in the context of sensitive information handling within applications, particularly in scenarios such as e-commerce transactions and data processing.

First and foremost, these techniques enable a proactive approach to data sanitization, offering a multi-faceted strategy to identify and protect sensitive data dynamically. By employing deterministic algorithms and advanced ML classification algorithms, this approach not only accurately identifies sensitive data but also assesses its risk profile, distinguishing between high-risk and low-risk data.

Furthermore, the ability to perform both destructive and non-destructive sanitization processes ensure flexibility in data protection. High-risk sensitive data may be replaced with synthetic data or securely encrypted, thereby minimizing the risk of data exposure without compromising functionality.

The incorporation of exact matching, similarity matching, and probability score analysis, facilitated by contextual-based and pattern matching ML models, further refines the risk assessment process. This enables real-time decision-making regarding the protection of sensitive data, ensuring that the most appropriate and effective sanitization methods are applied.

These techniques also offer scalability and adaptability, making them suitable for various sectors, including retail, finance, healthcare, and more. They may be seamlessly integrated into web and mobile applications, enhancing the overall security posture of these platforms. Further, the techniques discussed above may be applied in multiple sectors, for example, retail sector, E-commerce sector, online advertising sector, social media sector, telecommunications sector, insurance sector, automotive industry, financial services, travel sector, transportation sector, logistics sector, real estate sector, public and social sector, sports sector, energy sector, mining sector, healthcare sector, education sector, or consumer packaged goods sector. Moreover, the techniques discussed above may be implemented on one of a consumer website, an enterprise website, a consumer web application, an enterprise web application, or an instore display application to provide decision experience, transactional experience, educational experience, browsing and consumption experience, or assistive experience.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for sanitization of sensitive data. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What we claim is:

1. A method for sanitization of sensitive data, the method comprising:
   analyzing, by a computing device, one or more sensitive data present within a page of an application based on a deterministic algorithm;
   classifying, by the computing device, the one or more sensitive data into a high risk sensitive data and a low risk sensitive data based on a Machine Learning (ML) classification algorithm; and
   for the one or more sensitive data classified as the high risk sensitive data, performing at least one of:
      a destructive sanitization on each of the high risk sensitive data, wherein the destructive sanitization comprises:
         generating synthetic data replicating characteristics, format, and structure of the high risk sensitive data; and
         replacing the high risk sensitive data with the synthetic data; or
      a non-destructive sanitization on each of the high risk sensitive data, wherein the non-destructive sanitization comprises:
         encrypting the high risk sensitive data through an encryption key;
         generating synthetic data replicating characteristics, format, and structure of the high risk sensitive data; and
         replacing the high risk sensitive data encrypted within the page with the synthetic data.

2. The method of claim 1, further comprising rendering the page to a user upon completing one of the destructive sanitization or the non-destructive sanitization for the one or more sensitive data.

3. The method of claim 1, wherein the one or more sensitive data comprises variable names, variable parameters, variable contents, file names, and text-based file content within the page.

4. The method of claim 1, wherein the ML classification algorithm utilizes a contextual based ML model and a pattern matching ML model for classifying the one or more sensitive data.

5. The method of claim 4, wherein the contextual based ML model is trained on a dataset of text-based predefined data associated with the one or more sensitive data.

6. The method of claim 4, wherein the pattern matching ML model is trained on a dataset of predefined patterns associated with the one or more sensitive data.

7. The method of claim 1, further comprising:

performing an exact matching analysis and a similarity matching analysis to determine a similarity for each of the one or more sensitive data present within the page.

8. The method of claim 7, wherein performing the exact matching analysis comprises:

comparing the one or more sensitive data with the dataset of predefined patterns; and determining a similarity score for each of the one or more sensitive data based on comparing, wherein if the similarity score is determined to be 1, tagging the one or more sensitive data as an exactly matched sensitive data.

9. The method of claim 7, wherein performing the similarity matching analysis comprises:

comparing the one or more sensitive data with the dataset of predefined patterns; and determining a similarity score for each of the one or more sensitive data based on comparing, wherein if the similarity score is determined to be less than 1, tagging the one or more sensitive data as a similar matched sensitive data.

10. The method of claim 7, further comprising:

performing a probability score analysis to determine a risk associated with each of the one or more sensitive data.

11. The method of claim 10, wherein performing the probability score analysis comprises:

determining a probability score for each of the one or more sensitive data, wherein if the probability score is determined to be greater than a predefined threshold, tagging the one or more sensitive data as the high risk sensitive data, and wherein if the probability score is determined to be less than the predefined threshold, tagging the one or more sensitive data as the low risk sensitive data.

12. The method of claim 1, wherein the synthetic data generated during each of the destructive sanitization and the non-destructive sanitization resembles to the one or more sensitive data of the page in terms of data type, format, and structure.

13. A system sanitization of sensitive data, the system comprising:

a processing circuitry; and a memory communicatively coupled to the processing circuitry, wherein the memory stores processor instructions, which when executed by the processing circuitry, cause the processing circuitry to:

analyze one or more sensitive data present within a page of an application based on a deterministic algorithm;

classify the one or more sensitive data into a high risk sensitive data and a low risk sensitive data based on a Machine Learning (ML) classification algorithm; and for the one or more sensitive data classified as the high risk sensitive data, perform at least one of:

a destructive sanitization on each of the high risk sensitive data, wherein the destructive sanitization comprises:

generating synthetic data replicating characteristics, format, and structure of the high risk sensitive data; and replacing the high risk sensitive data with the synthetic data; or a non-destructive sanitization on each of the high risk sensitive data, wherein the non-destructive sanitization comprises:

encrypting the high risk sensitive data through an encryption key;

generating synthetic data replicating characteristics, format, and structure of the high risk sensitive data; and replacing the high risk sensitive data encrypted within the page with the synthetic data.

14. The system of claim 13, wherein the processor instructions, on execution, further cause the processing circuitry to render the page to a user upon completing one of the destructive sanitization or the non-destructive sanitization for the one or more sensitive data.

15. The system of claim 13, wherein the ML classification algorithm utilizes a contextual based ML model and a pattern matching ML model for classifying the one or more sensitive data, wherein the contextual based ML model is trained on a dataset of text-based predefined data associated with the one or more sensitive data, and wherein the pattern matching ML model is trained on a dataset of predefined patterns associated with the one or more sensitive data.

16. The system of claim 15, wherein the processor instructions, on execution, further cause the processing circuitry to perform an exact matching analysis and a similarity matching analysis to determine a similarity for each of the one or more sensitive data present within the page.

17. The system of claim 16, wherein to perform the exact matching analysis, the processor instructions, on execution, further cause the processing circuitry to:

compare the one or more sensitive data with the dataset of predefined patterns; and determine a similarity score for each of the one or more sensitive data based on comparison, wherein if the similarity score is determined to be 1, tag the one or more sensitive data as an exactly matched sensitive data.

18. The system of claim 16, wherein to perform the similarity matching analysis, the processor instructions, on execution, further cause the processing circuitry to:

compare the one or more sensitive data with the dataset of predefined patterns; and determine a similarity score for each of the one or more sensitive data based on comparison, wherein if the similarity score is determined to be less than 1, tag the one or more sensitive data as a similar matched sensitive data.

19. The system of claim 18, wherein the processor instructions, on execution, further cause the processing circuitry to perform a probability score analysis to determine a risk associated with each of the one or more sensitive data.

20. The system of claim 19, wherein to perform the probability score analysis, the processor instructions, on execution, further cause the processing circuitry to:

determine a probability score for each of the one or more sensitive data, wherein if the probability score is determined to be greater than a predefined threshold, tag the one or more sensitive data as the high risk sensitive data, and wherein if the probability score is determined to be less than the predefined threshold, tag the one or more sensitive data as the low risk sensitive data.

* * * * *